(12) United States Patent
Kinoshita

(10) Patent No.: US 10,389,808 B2
(45) Date of Patent: Aug. 20, 2019

(54) STORAGE SYSTEM AND CONTROL METHOD THEREOF

(71) Applicant: Toshiba Memory Corporation, Minato-ku, Tokyo (JP)

(72) Inventor: Atsuhiro Kinoshita, Kamakura Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 475 days.

(21) Appl. No.: 14/725,892

(22) Filed: May 29, 2015

(65) Prior Publication Data

US 2016/0226974 A1 Aug. 4, 2016

(30) Foreign Application Priority Data

Feb. 4, 2015 (JP) .................................. 2015-019963

(51) Int. Cl.
| | |
|---|---|
| G06F 15/16 | (2006.01) |
| H04L 29/08 | (2006.01) |
| H04L 12/721 | (2013.01) |
| G06F 11/00 | (2006.01) |
| H04L 12/773 | (2013.01) |

(52) U.S. Cl.
CPC .......... *H04L 67/1097* (2013.01); *G06F 11/00* (2013.01); *H04L 45/70* (2013.01); *H04L 45/60* (2013.01)

(58) Field of Classification Search
CPC .......... G06F 11/00; H04L 45/60; H04L 45/70; H04L 67/1097
See application file for complete search history.

(56) References Cited

U.S. PATENT DOCUMENTS

| | | | |
|---|---|---|---|
| 5,794,062 A | 8/1998 | Baxter | |
| 5,805,871 A | 9/1998 | Baxter | |
| 5,933,642 A | 8/1999 | Greenbaum et al. | |
| 6,021,186 A | 2/2000 | Suzuki et al. | |
| 6,055,618 A | 4/2000 | Thorson | |
| 6,077,315 A | 6/2000 | Greenbaum et al. | |
| 6,594,752 B1 | 7/2003 | Baxter | |
| 8,397,009 B2 | 3/2013 | Jacquet | |
| 8,726,064 B2 | 5/2014 | Bennett | |
| 2005/0268070 A1 | 12/2005 | Baxter | |
| 2008/0215903 A1* | 9/2008 | Payne | G06F 1/3203 713/322 |
| 2012/0117354 A1* | 5/2012 | Tatsumura | H04L 12/6418 711/200 |

(Continued)

FOREIGN PATENT DOCUMENTS

| | | |
|---|---|---|
| JP | 2000-242613 A | 9/2000 |
| JP | 2004-118855 A | 4/2004 |

(Continued)

*Primary Examiner* — Normin Abedin
(74) *Attorney, Agent, or Firm* — White & Case LLP

(57) ABSTRACT

According to one embodiment, a storage system includes a storage which includes a plurality of node memories including a nonvolatile memory and a control unit which controls the nonvolatile memory and a routing unit which controls packet transfer between two or more of the node memories, a connection unit which connects the storage unit to outside and controls the storage unit, and a management unit which at least monitors power supply voltages of the storage and the connection unit.

17 Claims, 33 Drawing Sheets

(56) References Cited

U.S. PATENT DOCUMENTS

2014/0195710 A1 7/2014 Sasaki et al.
2015/0293710 A1 10/2015 Kinoshita et al.

FOREIGN PATENT DOCUMENTS

| JP | 2012-103926 A | 5/2012 |
| JP | 2014-134981 A | 7/2014 |
| JP | 5659289 B1 | 1/2015 |

* cited by examiner

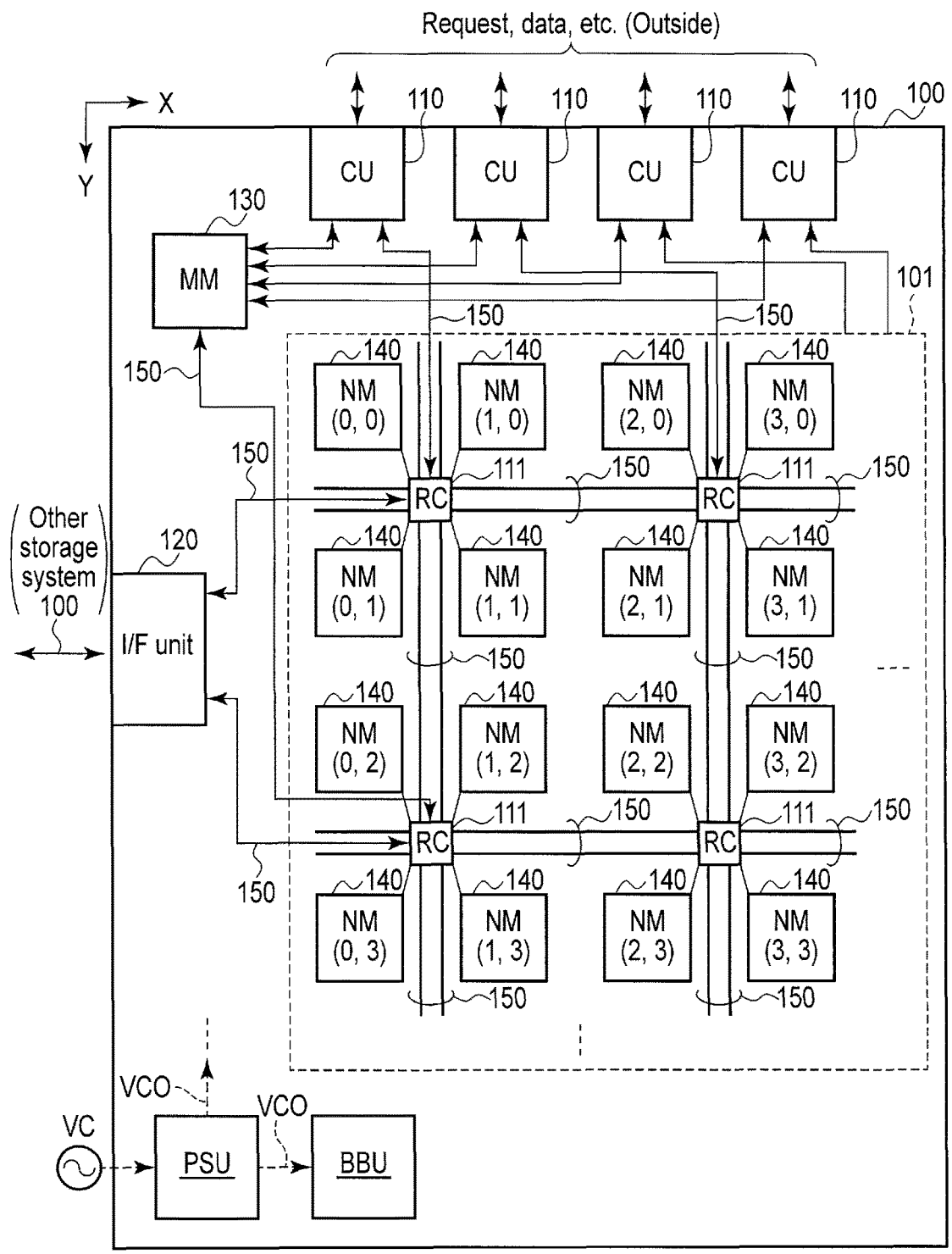
F I G. 1

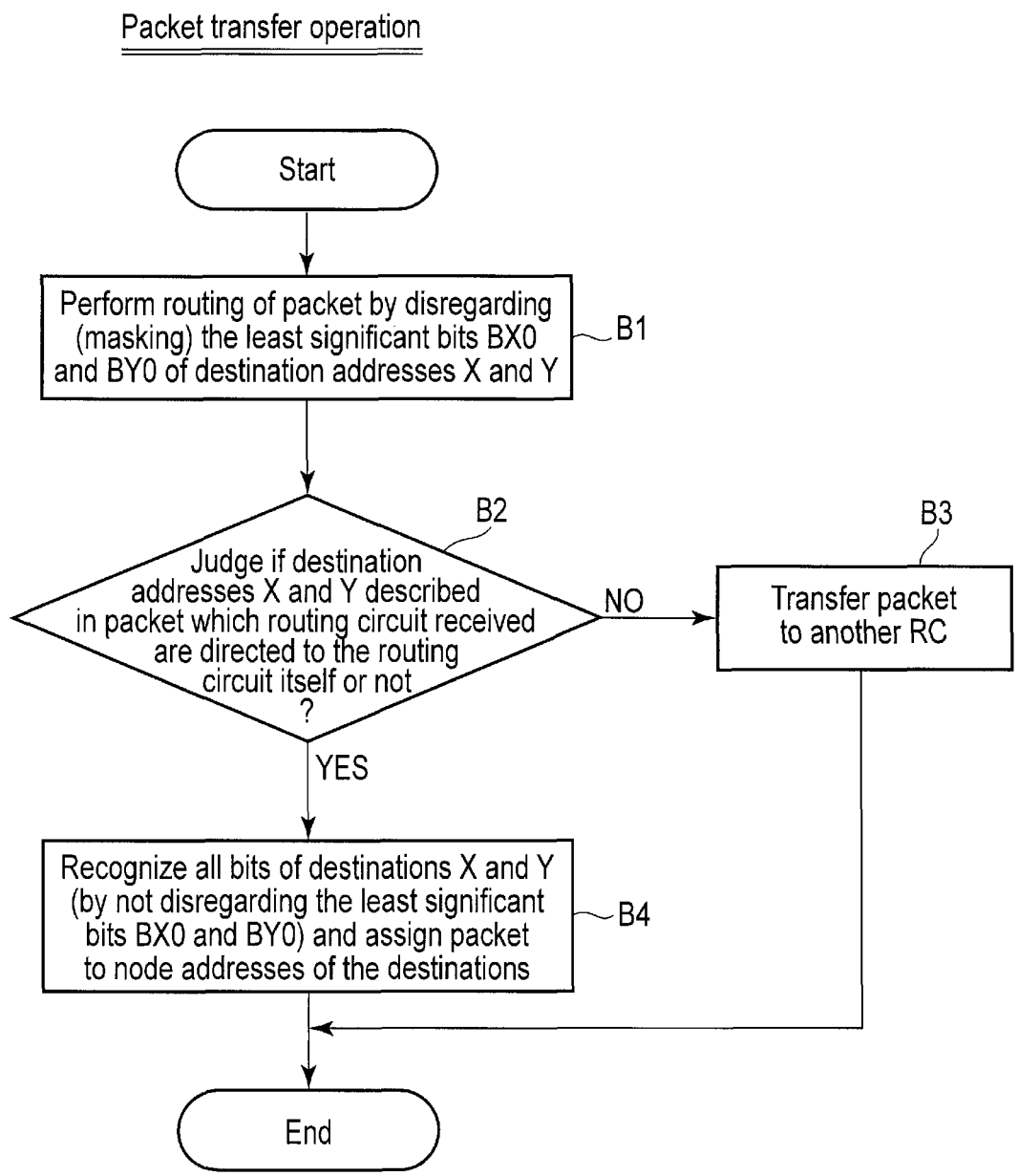
F I G. 7

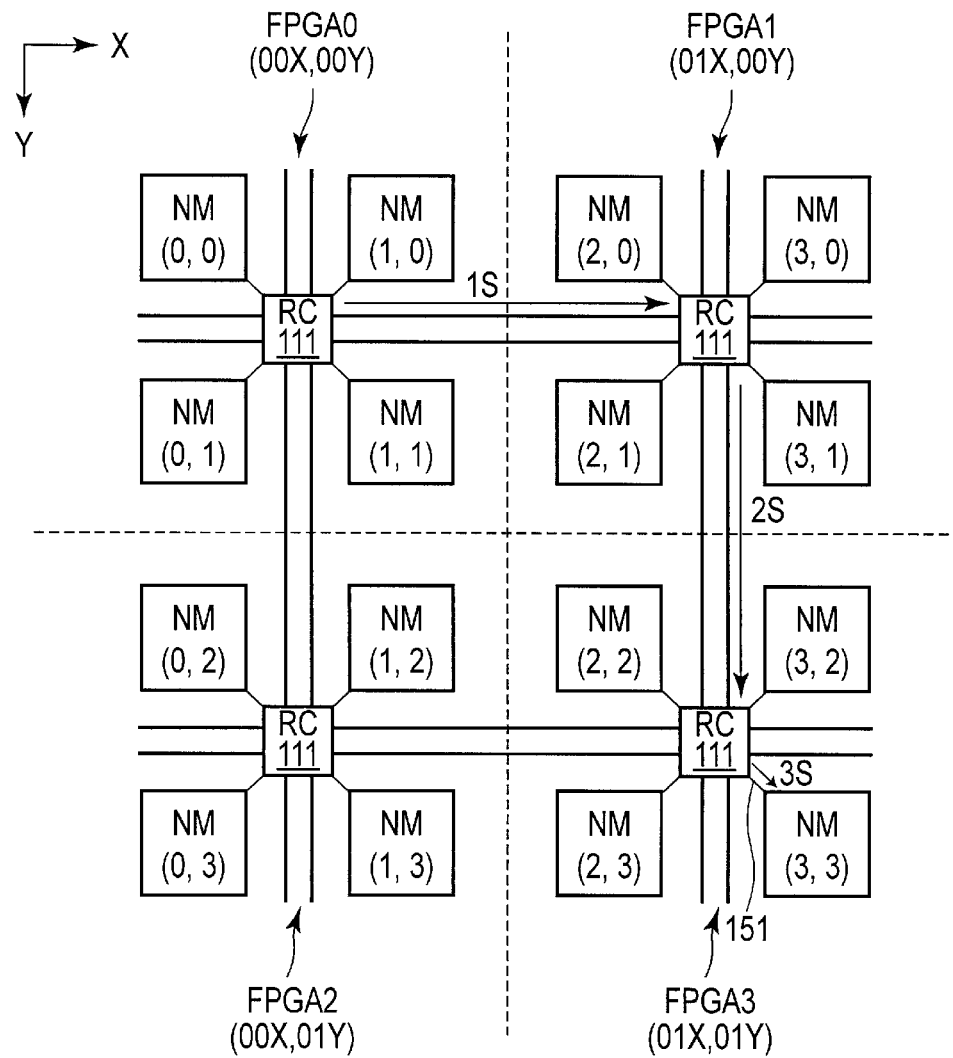
F I G. 10

Storage system(Comparative example)

Storage system(Comparative example)

Storage system(Comparative example)

Storage system(Comparative example)

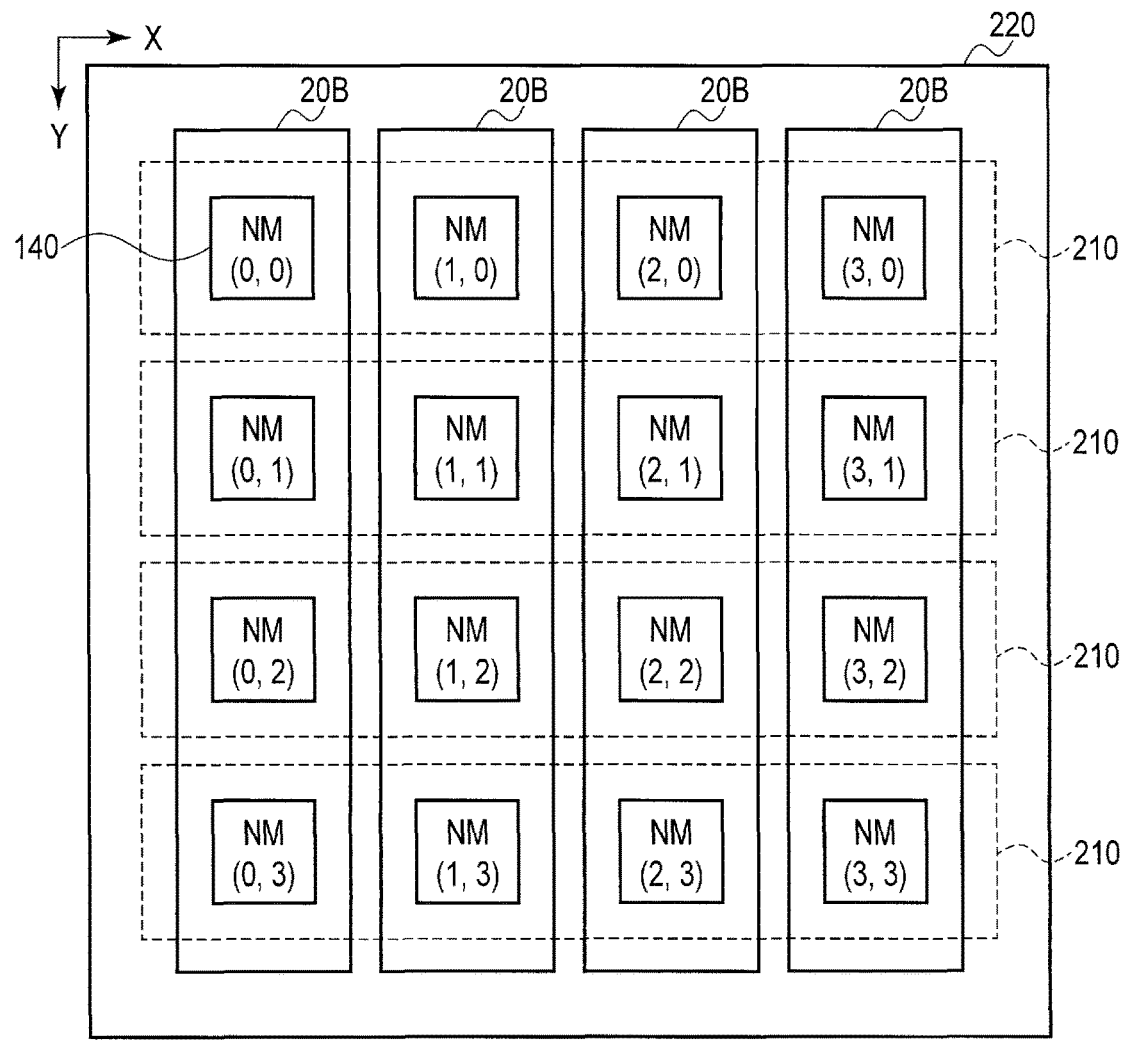
F I G. 16

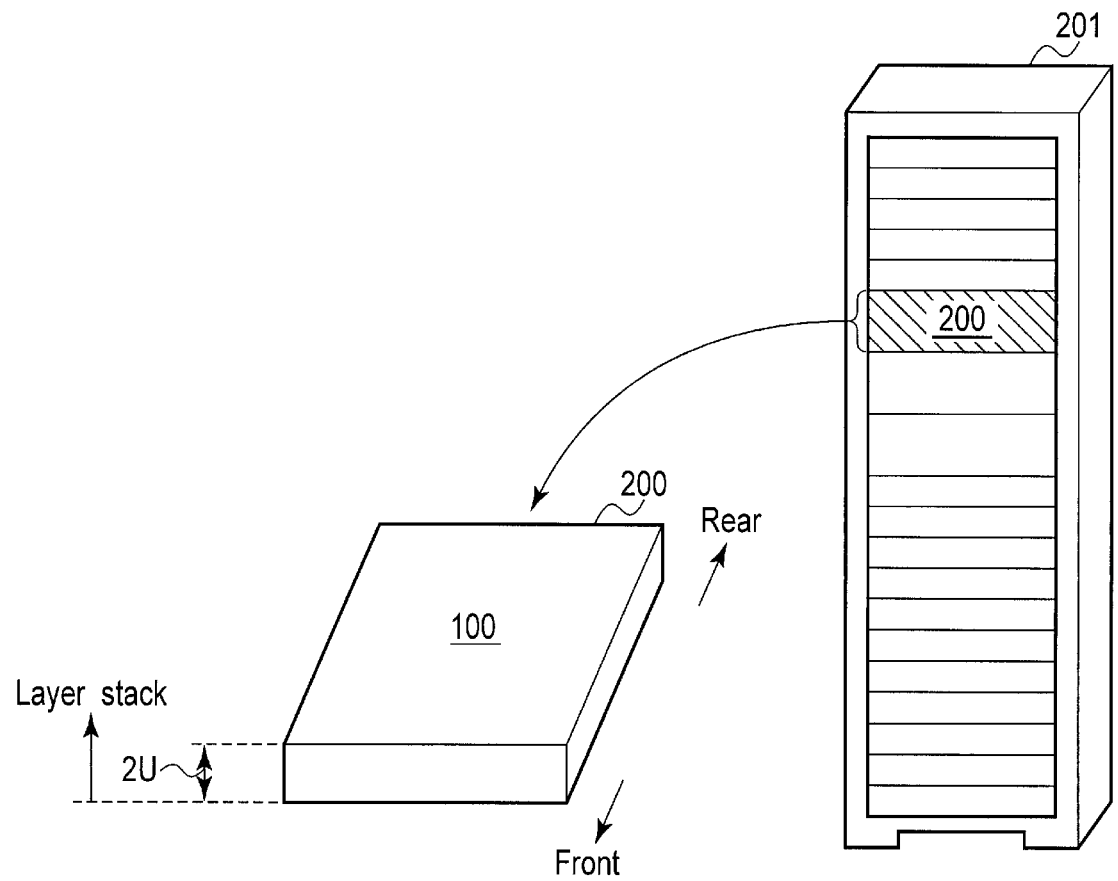
F I G. 18

Enclosure 200 (Front side)

Enclosure 200 (Rear side)

Enclosure 200 (Layer stack side)

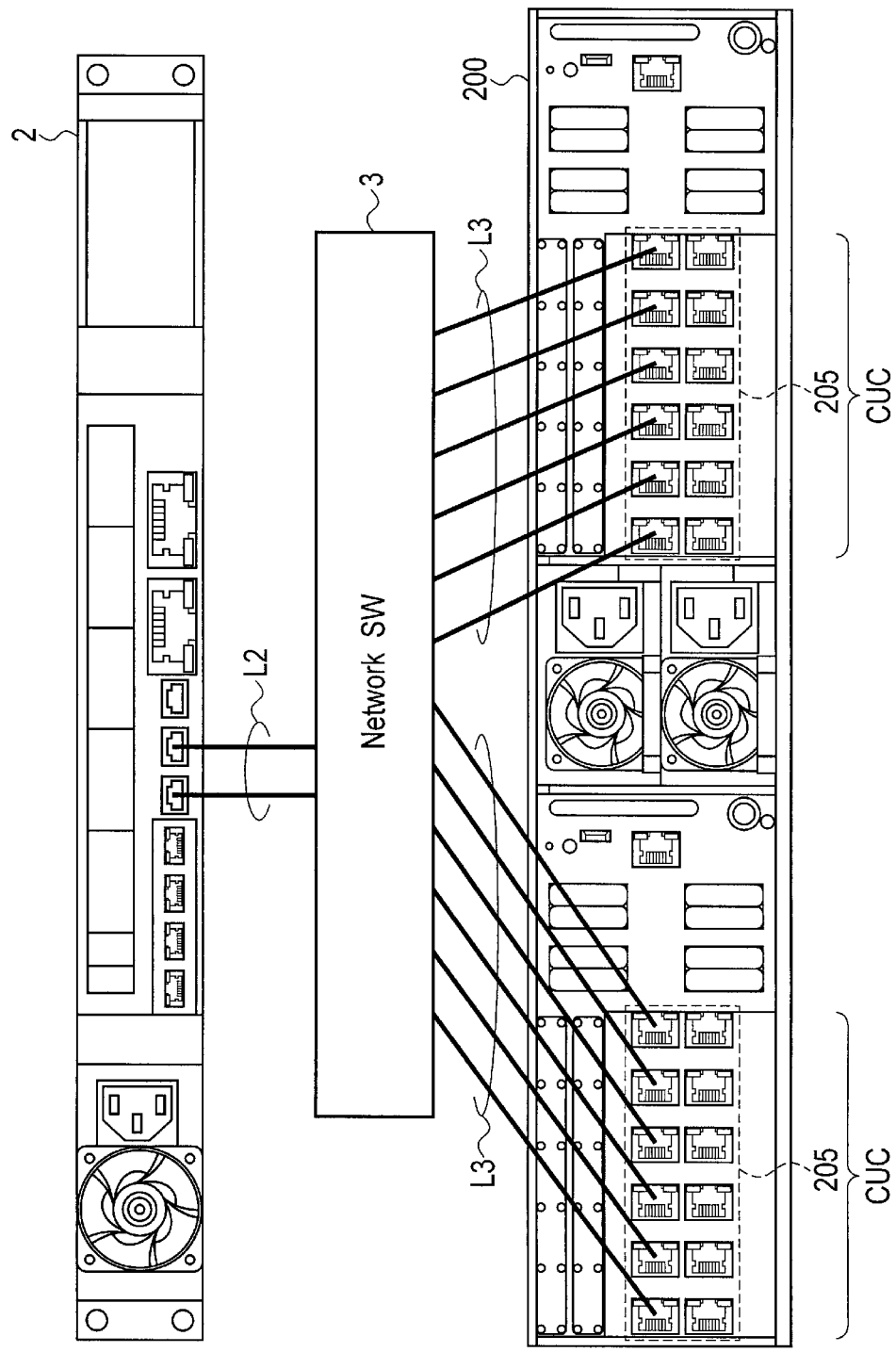
F I G. 24

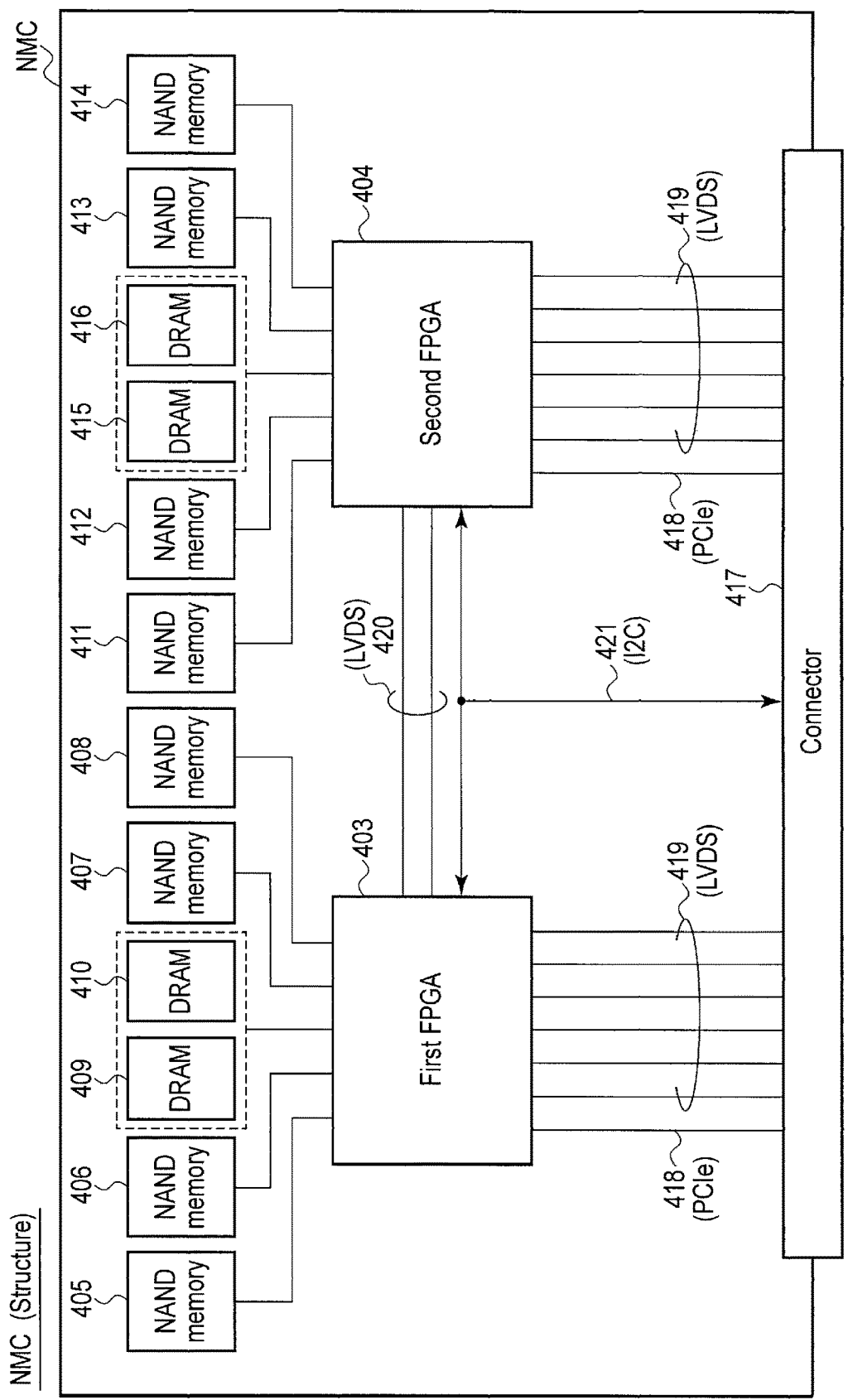
F I G. 25

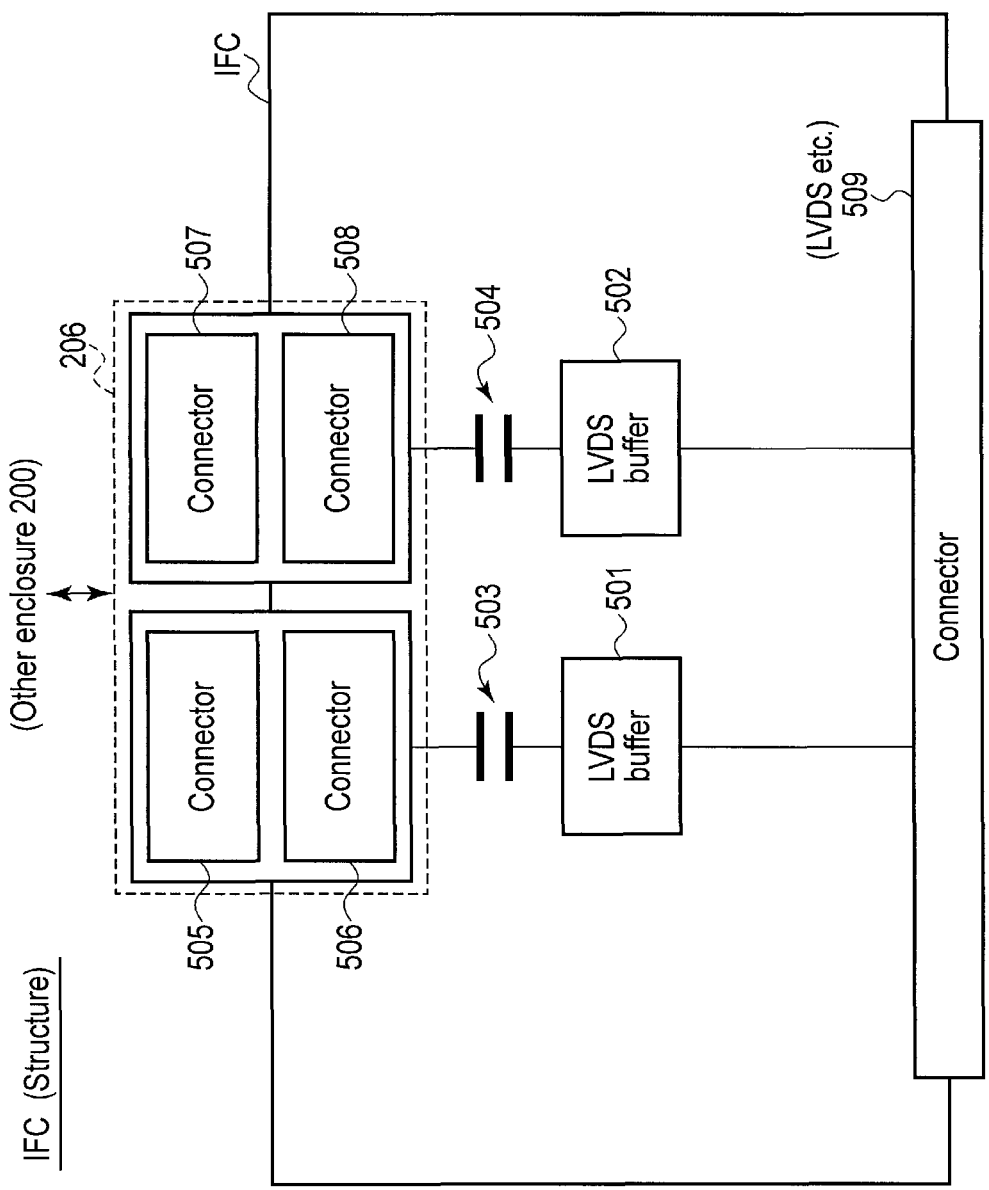
F I G. 29

Connection relationship between CUC and MMC

Enclosure (Connection example 1)

Storage unit 101 (Connection example 1)

STORAGE SYSTEM AND CONTROL METHOD THEREOF

CROSS-REFERENCE TO RELATED APPLICATIONS

This application is based upon and claims the benefit of priority from Japanese Patent Application No. 2015-019963, filed Feb. 4, 2015, the entire contents of which are incorporated herein by reference.

FIELD

Embodiments described herein relate generally to a storage system and a control method thereof.

BACKGROUND

There is a case where a plurality of information processing apparatuses including a storage system is connected to each other through a network to configure a single information processing system. As one example of the information processing system, there is a cloud computing system. In recent years, the application of data such as cloud data in an information processing system a tendency to increase.

BRIEF DESCRIPTION OF THE DRAWINGS

FIG. 1 is a block diagram showing a storage system according to the first embodiment;
FIG. 7 is a flowchart showing a packet transfer operation of an RC according to the first embodiment;
FIG. 10 is a diagram illustrating the number of transfer steps according to the first embodiment;
FIG. 16 is a diagram showing an example of redundancy of a storage unit according to the third embodiment;
FIG. 18 is a perspective view showing a server rack capable of mounting an enclosure enclosing a memory system according to the third embodiment;
FIG. 24 is a view showing an example of an employed configuration of the enclosure;
FIG. 25 is a block diagram showing an example configuration of an NM card;
FIG. 29 is a block diagram showing an example configuration of an I/F card.

DETAILED DESCRIPTION

Figure 2:
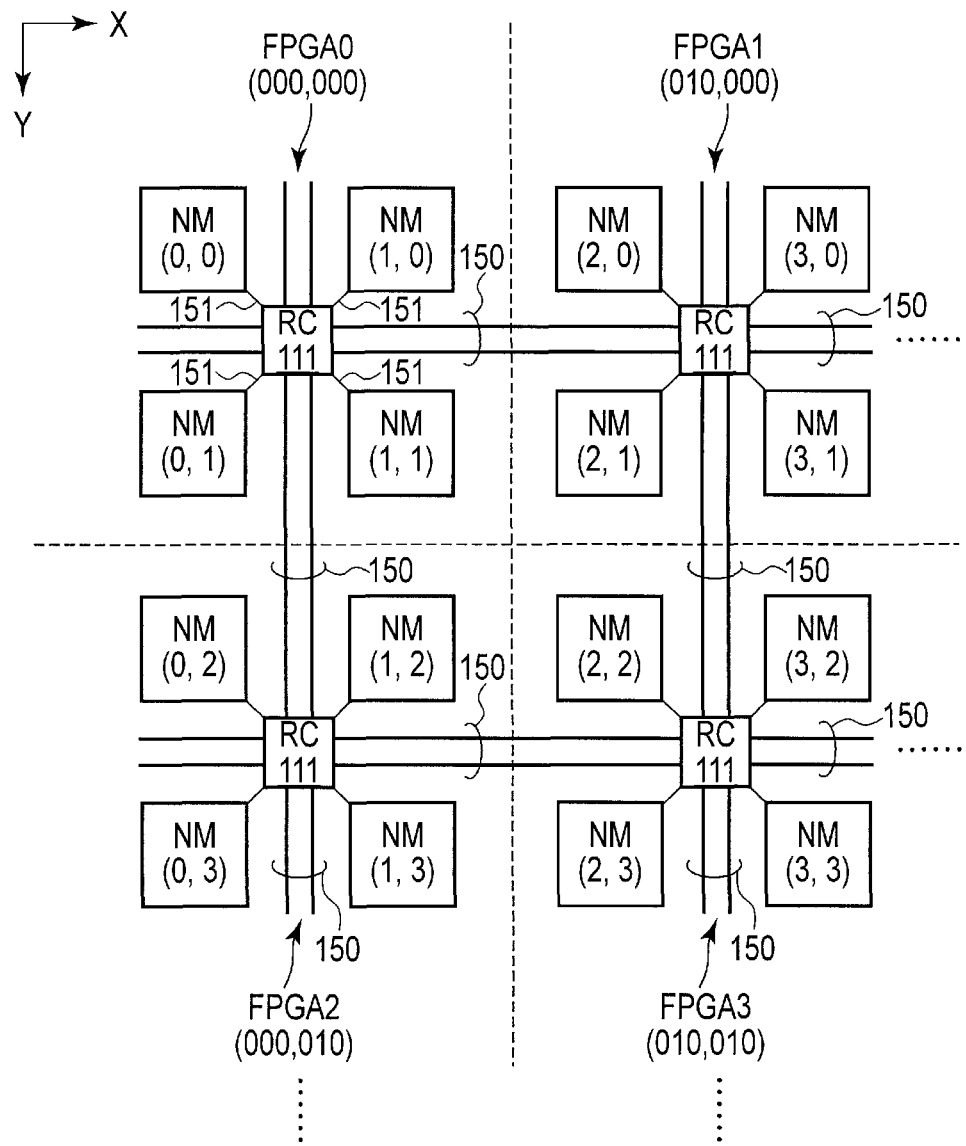
FIG. 2 is a block diagram showing a storage unit according to the first embodiment.

In general, according to one embodiment, a storage system includes a storage which includes a plurality of node memories including a nonvolatile memory and a control unit which controls the nonvolatile memory and a routing unit which controls packet transfer between two or more of the node memories, a connection unit which connects the storage unit to outside and controls the storage unit, and a management unit which at least monitors power supply voltages of the storage and the connection unit. The routing unit separates routing of the packet on the basis of type of received packet.

Various embodiments will be described hereinafter with reference to the accompanying drawings.

In the following description, one same reference numeral is assigned to functions or elements which are substantially the same, and description is given as necessary. In the specification of the present application, more than two terms are given to some of the elements. These terms are merely examples, and those elements may be expressed with other terms.

Furthermore, components which are given only one term may be expressed with other terms.

First Embodiment

[1. Configuration]
[1-1. Overall Configuration (Storage System)]

First, referring to FIG. 1, the overall configuration of a storage system 100 according to the first embodiment will be described briefly.

As shown, the storage system 100 according to the first embodiment includes a storage unit 101, connection units (CU) 110, an interface unit (I/F unit) 120, a management module (MM) 130, a power supply unit PSU and a battery backup unit BBU.

[Storage Unit]

The storage unit 101 includes a plurality of routing circuits (RC) 111 and a plurality of node modules (NM) 140, which are arranged in a matrix. With this arrangement, the storage unit 101 stores data items by distributing the data to the plurality of NMs 140, and performs decentralized and parallel data processing.

Each of the routing circuits (routing units, torus routing) 111 is configured to transfer a packet including data transferred from a connection unit (CU) 110, another routing circuit 11 or the like, in a predetermined mode through a meshed network. The routing circuits 111 each include two or more interfaces 150. One routing circuit 111 is electrically connected to its adjacent routing circuit 111 via the interfaces 150. The routing circuits 111 will be described in detail later.

Each NM (memory unit) 140 is electrically connected to its adjacent NMs 140 through a routing circuit 111 and a packet management unit (PMU) which is not shown in FIG. 1.

FIG. 1 shows an example of a rectangular network in which the NMs 140 are arranged on their respective lattice points. In this regard, the coordinate of each lattice point is represented in decimal notations, (x, y). Assume that the positional information of an NM 140 located on a lattice point is represented by a relative node address $(x_D, y_D)$ (=decimal notation) which corresponds to the coordinate of the lattice point. In the example shown, the NM 140 located in the upmost leftmost corner has the origin node address (0, 0). The relative node address of each NM 140 increases/decreases in response to a variation in integral values of the horizontal direction (X-axis direction) and vertical direction (Y-axis direction).

Each NM 140 is connected to two or more NMs 140 adjacent thereto in different directions. For example, the NM 140 (0, 0) located in the upmost leftmost corner is connected to an NM 140 (1, 0) adjacent thereto in the X-axis direction, an NM 140 (0, 1) adjacent thereto in the Y-axis direction which is different from the X-axis direction, and an NM 140 (1, 1) adjacent thereto in an oblique direction. Hereinafter, in a case where an NM 140 is represented by a relative node address $(x_D, y_D)$, it may simply be referred to as a node $(x_D, y_D)$.

In FIG. 1, the NMs 140 are shown such that they are arranged on each lattice point of a rectangular lattice; however, the arrangement of the NMs 140 is not limited to this example. In other words, as to the arrangement of the lattice, it only has to make each NM 140 located on a lattice point to be connected to two or more NMs 140 adjacent thereto in different directions. For example, the arrangement may be in triangle, hexagon and the like. In FIG. 1, the NMs 140 are arranged two-dimensionally; however, they may be arranged three-dimensionally as well. When the NMs 140 are arranged three-dimensionally, each of the NMs 140 may be represented in three decimal notations (x, y, z). When the NMs 140 are arranged two-dimensionally, they may be connected toroidally by connecting NMs 140 which are located on the opposite side to each other. The storage unit 101 will be described in detail later.

[Connection Unit (CU)]

CU 110 includes a predetermined connector connectable to an external user, to store data in the storage unit 101 and supply data read out from the storage unit 101 to the outside responding to a request (command, address, etc.) from the outside. Specifically, the CU 110 includes an arithmetic unit and a storage device, which will be described later. The arithmetic unit of the CU 110 executes a server application program utilizing the storage device as a work area.

The CU 110 processes the request from outside under the control of a server application. During the processing of the request from the outside, the CU 110 gains access to the storage unit 101. When the CU 110 access the storage unit 101, it generates a packet which a routing circuits 111 can transfer or execute, and transmits the generated packet to a routing circuit 111 connected to the CU 110 itself.

In the example of FIG. 1, the storage system 100 includes four CUs 110. The four CUs 110 are connected to different routing circuits 111, respectively.

The number of CUs 110 may be configured arbitrarily. Each of the CUs 110 may be connected to any one of the routing circuits 111 configuring the storage unit 101. One CU 110 may be connected to a plurality of routing circuits 111, and one routing circuit 111 may be connected to a plurality of CUs 110. The CU 110 may be connected to any one of the routing circuits 111 configuring the storage unit 101. The CUs 110 will be described in detail later.

[Interface Unit (I/F Unit)]

I/F unit 120 is a connection Interface for scaling out the storage unit 101. For example, physically separated two storage systems 100 can electrically be connected to each other via the I/F unit 120. By connecting, the storage units 101 of each storage system 100 are logically coupled to each other to be used as a single storage unit 101. The I/F unit 120 is electrically connected to one or more routing circuits 111 via the interfaces 150. In this regard, each interface 150 connected to two routing circuits 111 is connected to the I/F unit 120.

[Management Module (MM)]

MM 130 is electrically connected to each of the CUs 110 and a NM (0, 0). The MM 130 includes a baseboard management controller (BMC), which is not shown in FIG. 1. As some of the functions of the BMC, the MM 130 monitors an environment temperature, monitors and controls the number of revolutions of a fan, monitors and controls a power supply current and a power supply voltage, records the status of each CU 110, monitors the temperature of each CU 110, resets the CU 110, and the like.

In addition to the functions of the BMC, the MM 130 performs a processing (NM control processing) for the storage unit 101. The NM control processing is arbitrarily performed. For example, if a first memory 141, described later, is a NAND type flash memory, the MM 130 may perform wear leveling of the first memory 141. When a malfunction is found in the NM 140, the MM 130 may notify the outside via CU 110 that a card board on which the NM 140 with a malfunction is mounted should be replaced. The MM 130 may also rebuild RAID after the card board is replaced.

Node controllers (NC) 140C, described later, or CU 110 may detect malfunction of the NM 140. The detection of malfunction of the NM 140 can be performed based upon detection of an error of read data from the first memory 141 included in the NM 140. When the MM 130 performs a processing for the storage unit 101, it issues a packet corresponding to the processing. The MM 130 issues a packet that conforms to, for example, the pattern shown in FIG. 2, described later.

[Power Supply Unit (PSU)]

The power supply unit (main power supply section) PSU converts an external power supply voltage, which is applied from an external power supply VC, into a predetermined DC voltage, and applies a power supply voltage VCO corresponding to the DC voltage to the foregoing units and module (101, 110, 120, and 130). The external power supply VC is an AC power supply of, e.g., 100 V and 200 V. The storage system 100 according to the first embodiment includes two power supply units PSU-1 and PSU-2 (not shown). However, the configuration of the power supply units PSU is not limited to the shown configuration.

[Battery Backup Unit (BBU)]

The battery backup unit (battery unit, battery backup section) BBU receives a power supply voltage VCO from the power supply unit PSU and stores it therein. When the storage system 100 is electrically shut off from the external power supply VC, the battery backup unit BBU serves as an auxiliary power supply which applies a given auxiliary power supply voltage to the units and module (101, 110, 120, and 130). For example, even when a power failure occurs and power supply voltage from the external power supply VC stops being applied, the battery backup unit BBU applies an auxiliary power supply voltage to the foregoing units and module to operate the storage unit 101. Then, the node controllers (NC) 140C (not shown), which are included in the NM 140, back up user data to be protected by writing the user data (data copy) to the first memory 141 using the applied auxiliary power supply voltage.

[Interface Standard]

In the first embodiment, the following standards may be applied to the interfaces via which the foregoing units and module are electrically connected together:

a low voltage differential signaling (LVDS) standard, which is applied to an interface 150 via which routing circuits 111 are connected to each other;

a PCI Express (PCIe) standard, which is applied to an interface 150 via which a routing circuit 111 and a CU 110 are electrically connected to each other;

the above LVDS standard and a joint test action group (JTAG) standard, which are applied to an interface 150 via which a routing circuit 111 and an I/F unit 120 are electrically connected to each other; and the above PCIe standard and an inter-integrated circuit (I2C) standard, which are applied to an interface 150 via which an NM 140 and an MM 130 are electrically connected to each other.

These standards are only examples, and naturally other standards may be applied as necessary.

[1-2. Configuration of Storage Unit 101]

Next, referring to FIG. 2, an example configuration of the storage unit 101 will be described.

As shown in FIG. 2, the storage unit 101 includes a plurality of field-programmable gate arrays (FPGA). An FPGA includes one routing circuit 111 and four NMs 140. In FIG. 2, the four FPGAs, FPGA0 to FPGA3, are shown as examples. For example, FPGA0 includes one routing circuit 111 and four NMs (0, 0), (1, 0), (0, 1) and (1, 1).

Assume that each FPGA address of the four FPGAs is represented by (000, 000), (010, 000), (000, 010) and (010, 010) in binary notation.

In each of the FPGAs, one routing circuit 111 and four NMs are electrically connected to each other via a packet management unit (PMU), not shown, in the interfaces 151.

In a packet transfer operation, the routing circuits 111 perform routing while disregarding (masking) the least significant bits BX0 and BY0 of destination addresses x and y of the FPGA addresses. The packet transfer operation will be described in detail later.

[1-3. Configuration of FPGA]

Next, referring to FIG. 3, an example configuration of the FPGA will be described. In this regard, the configuration of FPGA0 shown in FIG. 2 will be described as one example.

Figure 3:
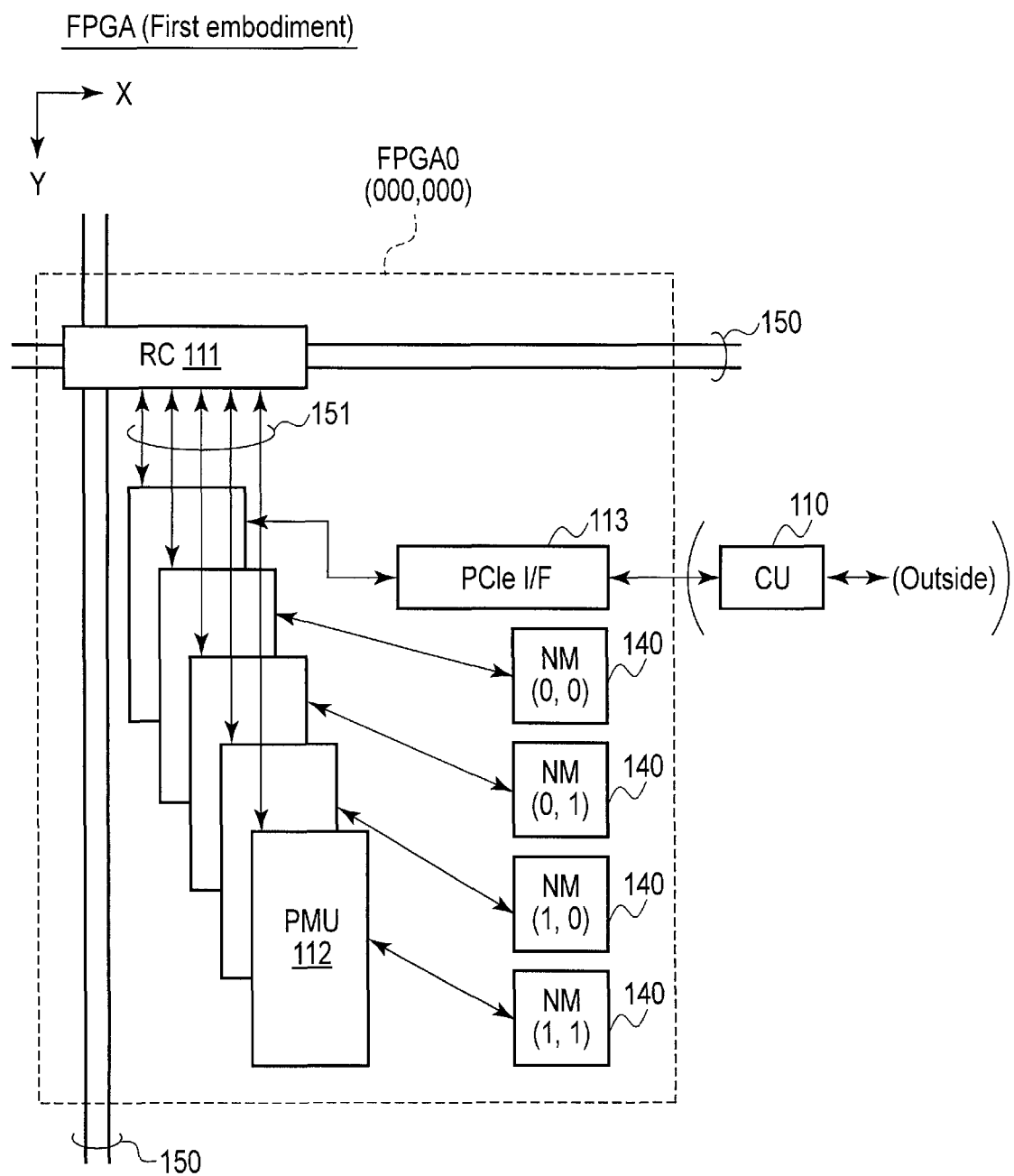
FIG. 3 is a block diagram showing an FPGA according to the first embodiment.

As shown in FIG. 3, the FPGA0 includes one routing circuit 111, four NMs 140, five packet management units (PMU) 112 and a CU interface (PCIe I/F) 113.

The PMUs 112 are provided to correspond to their respective CU 110 and NMs 140. Each PMU 112 analyzes a packet from the CU 110 and routing circuit 111. When the coordinate (relative node address) described in the analyzed packet coincide with the coordinate of the PMU 112, the PMU 112 transmits the packet directly to its corresponding NM 140. When coordinate described in the analyzed packet do not coincide with (when it is different from) the coordinate of the PMU 112, the PMU 112 returns a message to the routing circuit 11 accordingly.

For example, when the node address of the final destination is (3, 3), the PMU 112 connected to the node address (3, 3) determines that the coordinate (3, 3) described in the analyzed packet coincide with the coordinate (3, 3) of the PMU 112. Thus, the PMU 112 connected to the node address (3, 3) transmits the analyzed packet to the NM 140 of the node address (3, 3) connected to the PMU 112. The transmitted packet is subjected to a given processing based upon a request described in the packet, such as a processing of storing the packet in a nonvolatile memory in the NM 140, by the node controller (NC) 140C, not shown, in the NM 140.

The CU interface (PCIe I/F) 113 analyzes, for example, a request of the CU 110 and a packet. The CU interface 113 also transmits the analyzed request and packet to the PMU 112. The transmitted packet is transferred to another NM 140 through the routing circuit 111.

[1-4. Configuration of Node Module (NM)]

Figure 4:
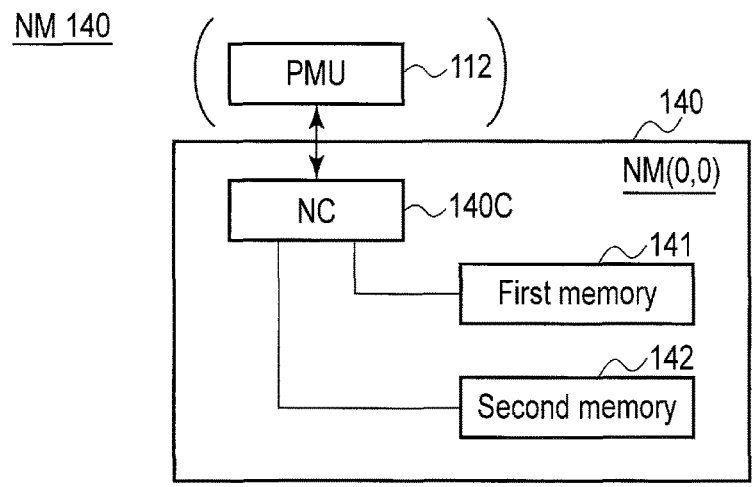
FIG. 4 is a block diagram showing an NM according to the first embodiment.

Next, referring to FIG. 4, an example configuration of the NM 140 is described. In this regard, the configuration of an NM (0, 0) 140 is described as one example.

As shown, the NM (0, 0) 140 includes a node controller (NC) 140C, a first memory 141 serving as a storage memory, and a second memory 142 that the NC 140C uses as a work area.

The PMU 112 is electrically connected to the NC 140C. The NC 140C receives a packet from the CU 110 or another NM 140 through the PMU 112, or transmits a packet to the CU 110 or another NM 140 through the PMU 112. When the destination of a packet is the NM 140 of the NC 140C itself, the NC 140C performs a processing corresponding to the packet (command recorded in the packet). For example, when the command is an access command (read command or write command), the NC 140C gains access to the first memory 141. When the destination of the received packet is not the NM 140 of the NC 140C itself, the NC 140C transfers the packet to another NM 140 connected to the NM 140 of the NC 140C itself.

As the first memory 141, for example, a NAND type flash memory (referred to as a NAND memory hereinafter), a bit cost scalable memory (BiCS), a magnetoresistive random access memory (MRAM), a phase change random access memory (PcRAM), a resistance random access memory (RRAM (registered trademark)), or any combination of these memories may be used.

As the second memory 142, different RAMs such as a dynamic random access memory (DRAM) may be used. When the first memory 141 serves as a work area, there is no need to provide the second memory 142 in the NM 140.

[1-5. Packet Composition]

Next, referring to FIG. 5, an example of a packet composition will be described.

Figure 5:
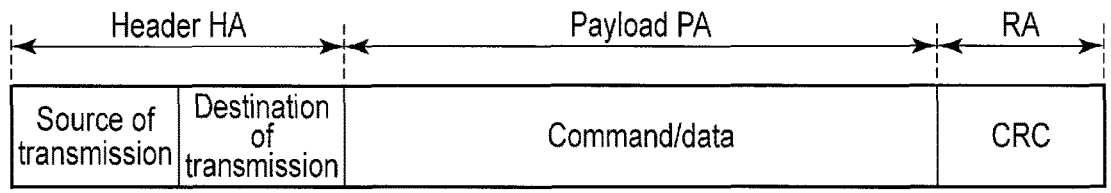
FIG. 5 is a block diagram showing a packet configuration according to the first embodiment.

As shown in FIG. 5, the packet according to the first embodiment includes a header area HA, a payload area PA and a redundant area RA.

In the header area HA, for example, an X-axis direction and Y-axis addresses of a source (from_x, from_y) and an X-axis direction and Y-axis addresses of a destination (to_x, to_y) are described.

In the payload area PA, for example, a command and data are described. The data size of the payload area PA is variable.

In the redundant area RA, for example, a cyclic redundancy check (CRC) code is described. The CRC code is a code (information) used to detect an error of data in the payload area PA.

The routing circuit 111, that has received a packet including the foregoing composition, determines a routing destination on the basis of a predetermined transfer algorithm. The routing circuits 111 according to the first embodiment perform routing while disregarding (masking) the least significant bits BX0 and BY0 of x-axis and y-axis addresses (to_x, to_y) of FPGA of the destination. On the basis of such transfer algorithm, the packet is transferred between the routing circuits 111 and reaches the NM 140 of the node address of the final destination.

For example, on the basis of the transfer algorithm, each routing circuit 111 determines a transfer destination to be an NM 140 located on a route with the minimum number of transfers from the NM 140 of the routing circuit 111 to the NM 140 of the destination. If there are a plurality of routes with the minimum number of transfers from the NM 140 of the routing circuit 111 to the NM 140 of the destination, the routing circuit 111 selects one of the routes by an arbitrary method. Likewise, when the NM 140 located on a route with the minimum number of transfers, selected from a plurality of NMs 140 connected to the NM 140 of the routing circuit 111, is malfunctioned or busy, the routing circuit 111 determines the transfer destination to be another NM 140.

In the storage unit 101, a plurality of NMs 140 are logically connected to each other through a meshed network. Thus, there is a case where there are a plurality of routes with the minimum number of packet transfers in the storage unit 101. In such a case, even when a plurality of packets whose destination is a specific NM 140 are issued, the issued packets are decentrally transferred via a plurality of routes by the foregoing transfer algorithm. Accordingly, it is possible to avoid access concentration on a specific NM 140 and prevent the degradation of throughput in the entire storage system 100.

[1-6. Configuration of CU]

Figure 6:
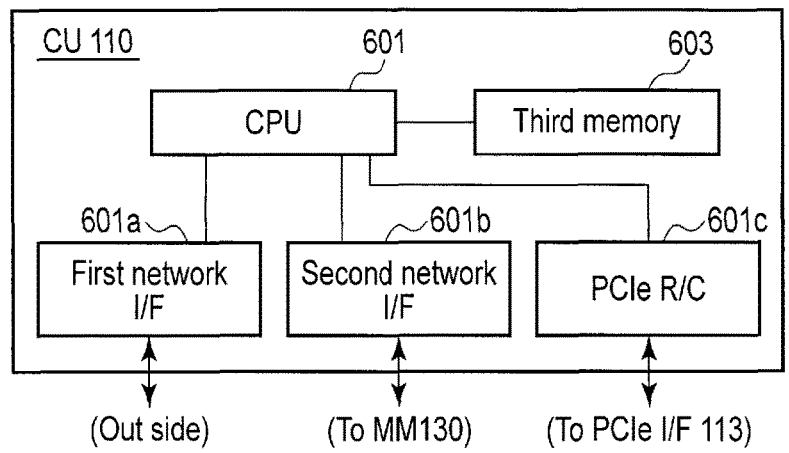
FIG. 6 is a block diagram showing a CU according to the first embodiment.

Next, referring to FIG. 6, an example of the CU 110 is described.

As shown in FIG. 6, the CU 110 according to the first embodiment includes a central processing unit (CPU) 601, and a third memory 603.

In response to a request (command, address, etc.) from outside, the CPU (control unit, arithmetic unit) 601 controls the storage unit 101 via a given connector connectable to an external user. The CPU 601 executes a server application program using the third memory 603 as a work area. Specifically, the CPU 601 processes a request from the outside under the control of a server application. When the CPU 601 gains access to the storage unit 101, it generates a packet that can be transferred and executed by a routing circuit 111, and transmits the generated packet to a routing circuit 111 connected to the CU 110 of the CPU 601.

The third memory 603 is a memory used as a work area of the CPU 601. As the third memory 603, for example, a nonvolatile semiconductor memory such as a DRAM and an SRAM may be used; however, the third memory 603 is not limited to these memories.

[2. Operation]

[2-1. Packet Transfer Operation]

Figure 8:
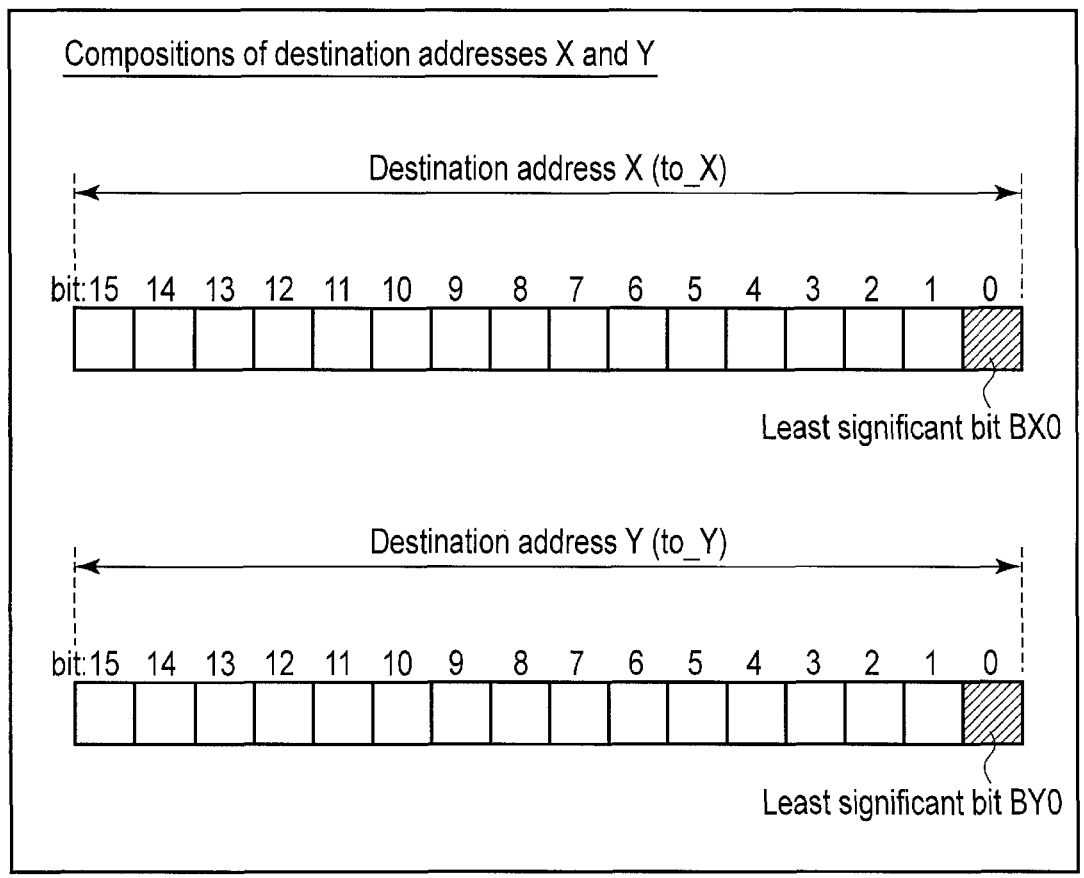
FIG. 8 is a diagram showing compositions of destination addresses X and Y according to the first embodiment.

Next, referring to FIG. 7 and FIG. 8, a packet transfer operation of the storage system 100 according to the first embodiment is described. The description is based on the flowchart shown in FIG. 7.

In step B1 shown in FIG. 7, when a routing circuit 111 receives a packet from the CU 110 or another routing circuit 111, it analyzes the X-axis and Y-axis addresses of a destination described in the header HA of the packet. In this process, the routing circuit 111 performs routing while disregarding (masking) the least significant bits of the X-axis and Y-axis addresses of FPGA of the destination.

As shown in FIG. 8, for example, the X-axis and Y-axis addresses (to_x, to_y) of FPGA of a destination of a packet according to the first embodiment are each described in 16 bits. In step B1, the routing circuit 111 routes the packet while disregarding the least significant bits BX0 and BY0 of the X-axis and Y-axis addresses (to_x, to_y) of FPGA of the destination, which are indicated as shaded areas in FIG. 8. In other words, the routing circuit 111 routes the packet, regardless of the least significant bits BX0 and BY0 of the X-axis and Y-axis addresses (to_x, to_y) of FPGA of the destination.

More specifically, when the four FPGA addresses are represented by (000, 000), (010, 000), (000, 010) and (010, 010) in binary notation as shown in FIG. 2, the routing circuit 111 routes a packet while disregarding the least significant bits of the four FPGA addresses. In other words, the routing circuit 111 disregards the least significant bits of the four FPGA addresses and consequently it routes a packet on the basis of the FPGA addresses represented by (00X, 00Y), (01X, 00Y), (00X, 01Y) and (01X, 01Y). In this instance, in the address notation, the bit status of each of the destination addresses X and Y is optional ("0" status or "1" status).

Subsequently, in step B2 shown in FIG. 7, the routing circuit 111 determines whether the destination addresses X and Y of the FPGA addresses described in the received packet are directed to the routing circuit 111 itself or not. In this process, the routing circuit 111 determines whether the addresses are directed to the routing circuit 111 itself, while disregarding the least significant bits BX0 and BY0 of the FPGA addresses of the destination, as described in step B1.

When the routing circuit 111 determines that the FPGA addresses of the received packet are not directed to the routing circuit 111 itself (NO in B2), in step B3, it transfers the packet to another RC (another routing circuit 111) in a route with the minimum number of packet transfers, and this operation ends.

When the routing circuit 111 determines that the FPGA addresses of the received packet are directed to the routing circuit 111 (YES in B2), in step B4, it recognizes all the bits of the FPGA addresses of the destination and assigns the packet to the node address, which is the destination of the recognized X-axis and Y-axis addresses. In other words, in step B4, the routing circuit 111 relatively assigns the packet to the node address, which is the destination of the recognized X-axis and Y-axis addresses, without disregarding the least significant bits BX0 and BY0 of the FPGA address of the destination (using the full addresses described in the packet). More specifically, the routing circuit 111 transfers the packet to the PMU 112 of the routing circuit 111, which corresponds to a destination node address. The PMU 112 to which the packet is transferred assigns the packet to the NM 140 of the destination node address, and this operation ends.

Advantageous Effects

As has been described above, at least the following advantageous effects (1) and (2) can be obtained from the configuration and operation of the storage system 100 according to the first embodiment.

(1) The Number of Packet Transfer Steps can be Reduced.

This advantageous effect is described by comparing the first embodiment with a comparative example.

A) Comparative Example

Figure 9:
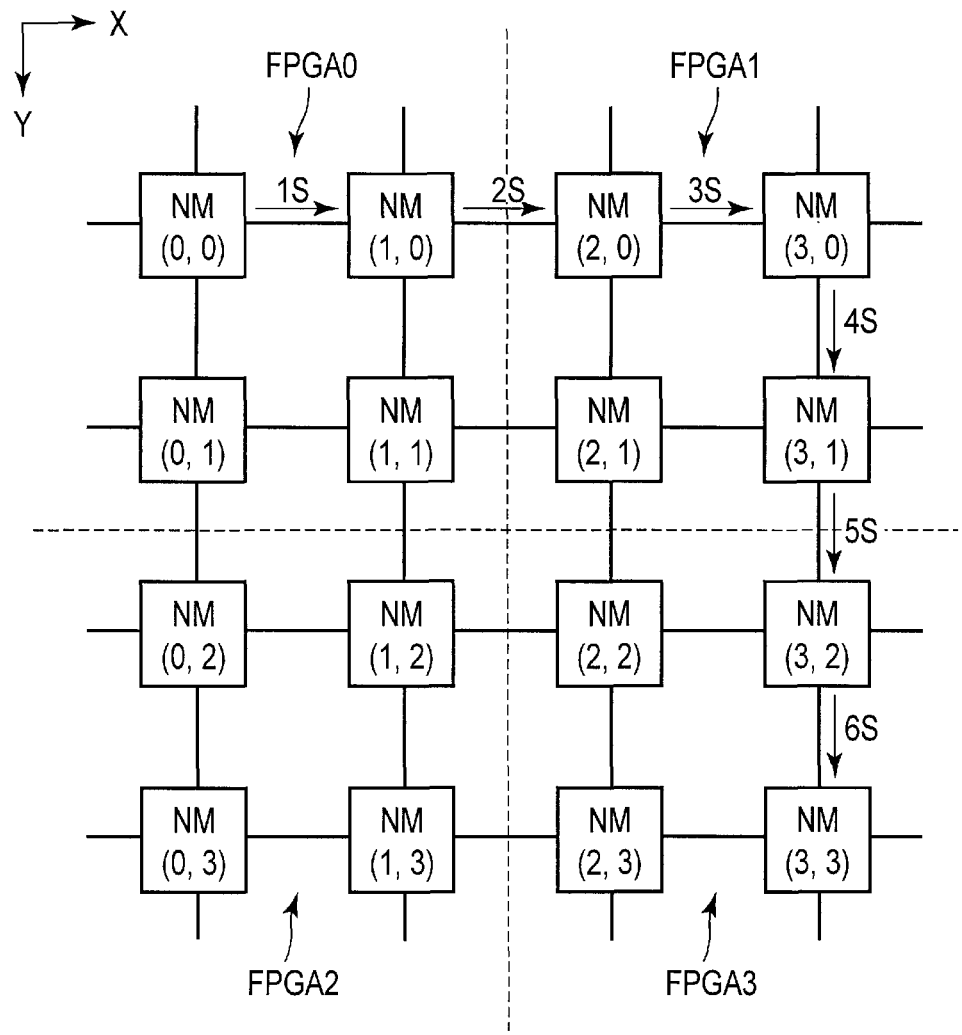
FIG. 9 is a diagram illustrating the number of transfer steps according to a comparative example.

First, a storage system according to a comparative example is described with reference to FIG. 9. Unlike the storage system according to the first embodiment, the storage system according to the comparative example does not include a routing circuit 111, as shown in FIG. 9. Thus, a packet according to the comparative example is transferred between NMs directly without using a routing circuit 111.

In the packet transfer operation, therefore, the packet is not routed by disregarding the least significant bits BX0 and BY0 of X-axis and Y-axis addresses (to_x, to_y) of FPGA of a destination. In other words, a storage unit according to the comparative example routes a packet on the basis of full sets of the X-axis and Y-axis addresses of FPGA of a destination.

As shown in FIG. 9, for example, when a packet is transferred from a node address (0, 0) to another node address (3, 3), it takes six steps (1S to 6S) in total to transfer a packet in a route with the minimum number of packet transfers. Specifically, a packet is transferred directly through NMs represented by the node addresses (0, 0)→(1, 0)→(2, 0)→(3, 0)→(3, 1)→(3, 2)→(3, 3) on the route.

No packet can be transferred along a route in a diagonal direction (e.g., node addresses: (0, 0)→(1, 1)→(2, 2)→(3, 3) taking a shortcut.

Thus, with the storage system according to the comparative example, the number of packet transfers increases. For example, when the transfer distance between a CU and an NM is long, the number of transfer steps increases even further. The increase in the number of transfer steps may cause increase in latency.

B) First Embodiment

In contrast to the comparative example, each of the FPGAs included in the storage unit 101 of the storage system 100 according to the first embodiment includes one routing circuit 111, four NMs 140, five packet management units (PMU) 112 and a CU interface (PCIe I/F) 113.

In the foregoing configuration, the routing circuit 111 performs routing while disregarding (masking) the least significant bits BX0 and BY0 of X-axis and Y-axis addresses (to_x, to_y) of FPGA addresses of a destination. In other words, the routing circuit 111 transfers a packet, regardless of the least significant bits BX0 and BY0 of the X-axis and Y-axis addresses (to_x, to_y) of FPGA of a destination. On the basis of the foregoing transfer algorithm, the packet is transferred between routing circuits 111 and reaches the NM 140 of the node address of the final destination.

A case where a packet is transferred from a node address (0, 0) (=binary notation: (000, 000)) to another node address (3, 3) (=binary notation: (011, 011)) in the same fashion, as shown in FIG. 10, will be described as one example. In this case, the number of transfer steps can be reduced to three (1S to 3S) in total along a route with the minimum number of packet transfers.

(1S)

First, each routing circuit 111 performs routing while disregarding the least significant bits BX0 and BY0 of X-axis and Y-axis direction addresses of FPGA addresses of a destination (in step B1). Thus, the routing circuit 111 routes a packet on the basis of each of the FPGA addresses (00X, 00Y) to (01X, 01Y) unless the address described in the packet is directed to the routing circuit 111 itself.

For example, when the destination of a packet is the node address (3, 3) (=binary notation: (011, 011), as shown in FIG. 10, the routing circuit 111 of FPGA0 determines whether its FPGA address (00X, 00Y) coincides with the node address (3, 3) (=binary notation: (011, 011)) described in the packet (B2). In this process, the routing circuit 111 determines whether the both addresses coincide with each other while disregarding the least significant bits BX0 and BY0 of the FPGA address. In this case, therefore, the routing circuit 111 determines that its FPGA address (00X, 00Y) does not coincide with the node address (3, 3) (=binary notation: (01X, 01Y)) described in the packet, and transfers the packet to an adjacent FPGA1 (B3).

(2S)

Similarly, the routing circuit 111 of the FPGA1 to which the packet is transferred, determines whether its FPGA address (01X, 00Y) coincides with the node address (3, 3) (=binary notation: (011, 011)) described in the packet (B2). In this process, the routing circuit 111 determines that its FPGA address (01X, 00Y) does not coincide with the node address (3, 3) (=binary notation: (01X, 01Y)) described in the packet, and transfers the packet to another adjacent FPGA3 (B3).

(3S)

Similarly, the routing circuit 111 of the FPGA3 to which the packet is transferred, determines whether its FPGA address (01X, 01Y) coincides with the node address (3, 3) (=binary notation: (011, 011)) described in the packet (B2). In this process, the routing circuit 111 determines that its FPGA address (01X, 01Y) coincides with the node address (3, 3) (=binary notation: (01X, 01Y)) described in the packet.

When the both addresses coincide with each other, the routing circuit 111 of the FPGA 3 recognizes all the bits of the FPGA address (3, 3) (=binary notation: (011, 011)) described in the packet, and assigns the packet to its node address, which is the destination of the recognized X-axis and Y-axis addresses (B4). In other words, the routing circuit 111 relatively assigns the packet to the node address, which is the destination of the recognized X-axis and Y-axis addresses, without disregarding the least significant bits BX0 and BY0 of the FPGA addresses described in the packet.

More specifically, the routing circuit 111 transfers the packet to its PMU 112 corresponding to a destination node address (3, 3) (=binary notation: (011, 011)). The PMU 112 to which the packet is transferred, assigns the packet to the NM 140 of a destination node address (3, 3) (=binary notation: (011, 011)) in the bottom rightmost corner. In the NM (3, 3) to which the packet is assigned, the NC 140C of the NM (3, 3) performs a desired operation, such as an operation of writing data in the packet to the first memory 141, on the basis of the command described in the packet.

As has been described above, in the packet transfer operation of the storage system 100 according to the first embodiment, each routing circuit 111 first disregards the least significant bits BX0 and BY0 and determines whether its address coincides with the address described in the packet on the basis of the addresses of the other higher-order bits (B1 to B2). When the both addresses coincide with each other, the routing circuit 111 considers all of the bits and assigns the packet to one of its subordinate NMs 140, which corresponds to the disregarded least significant bits BX0 and BY0 (B4).

With the above-described configuration and operation, the number of packet transfer steps can be reduced. For example, in the first embodiment, the number of packet transfer steps can be reduced to half or less, as compared to the comparative example. Furthermore, packet communications can be carried out in a diagonal direction taking a shortcut in addition to the X-axis and Y-axis directions (B4), and thus the number of packet transfer steps can be reduced.

(2) The Packet Transfer Algorithm Need not be Changed.

As has been described above, the storage system 100 according to the first embodiment includes routing circuits 111 each of which controls packet transfers between at least two NMs (memory units) 140. The unit in which each routing circuit 111 controls at least two NMs 140 together is, for example, $2^N$ (N is a natural number: 1, 2, 3, . . . ).

The routing circuits 111 each have only to perform routing while disregarding (masking) the least significant bits BX0 and BY0 in the packet transfer operation.

The storage system 100 according to the first embodiment is more advantageous than, for example, the comparative example in that the transfer algorithm, such as an address composition described in a packet, need not be changed. Therefore, the storage system 100 according to the first embodiment enables to decrease manufacturing costs because any unnecessary design change need not be made.

In the storage system 100 according to the first embodiment, at least 16 NMs 140 per one CU 110 can be controlled. Accordingly, at least 16 packets per one CU 110 can be communicated.

(Variation 1)

The routing circuits 111 according to the first embodiment each disregards (mask) the least significant bits BX0 and BY0 and perform routing in the packet transfer operation. Naturally, the first embodiment is not limited to this operation as long as the node addresses of a plurality of NMs 140 are routed together.

For example, each routing circuit 111 may disregard the most significant bits and perform routing in the packet transfer operation. More specifically, each routing circuit 111 determines whether its FPGA address coincides with a node address described in a packet on the basis of an address in which the most significant bits are disregarded. When the both addresses coincide with each other, the routing circuit 111 may recognize all the bits of an FPGA address of a destination and assign the packet to the node address, which is the destination of the recognized X-axis and Y-axis addresses.

For example, each routing circuit 111 may disregard part of the X-axis and Y-axis addresses and perform routing in the same manner in the packet transfer operation. Moreover, for example, each routing circuit 111 may disregard at least one bit of the X-axis and Y-axis addresses and perform routing in the same manner in the packet transfer operation.

Second Embodiment (Example of Preventing Occurrence of Deadlock)

Next, a storage system 100 according to the second embodiment is described. The second embodiment is an example of preventing occurrence of deadlock. In the following description, no detailed explanation overlapping to the first embodiment is given.

[Configuration (Detailed Configuration of Routing Circuit 111)]

Figure 11:
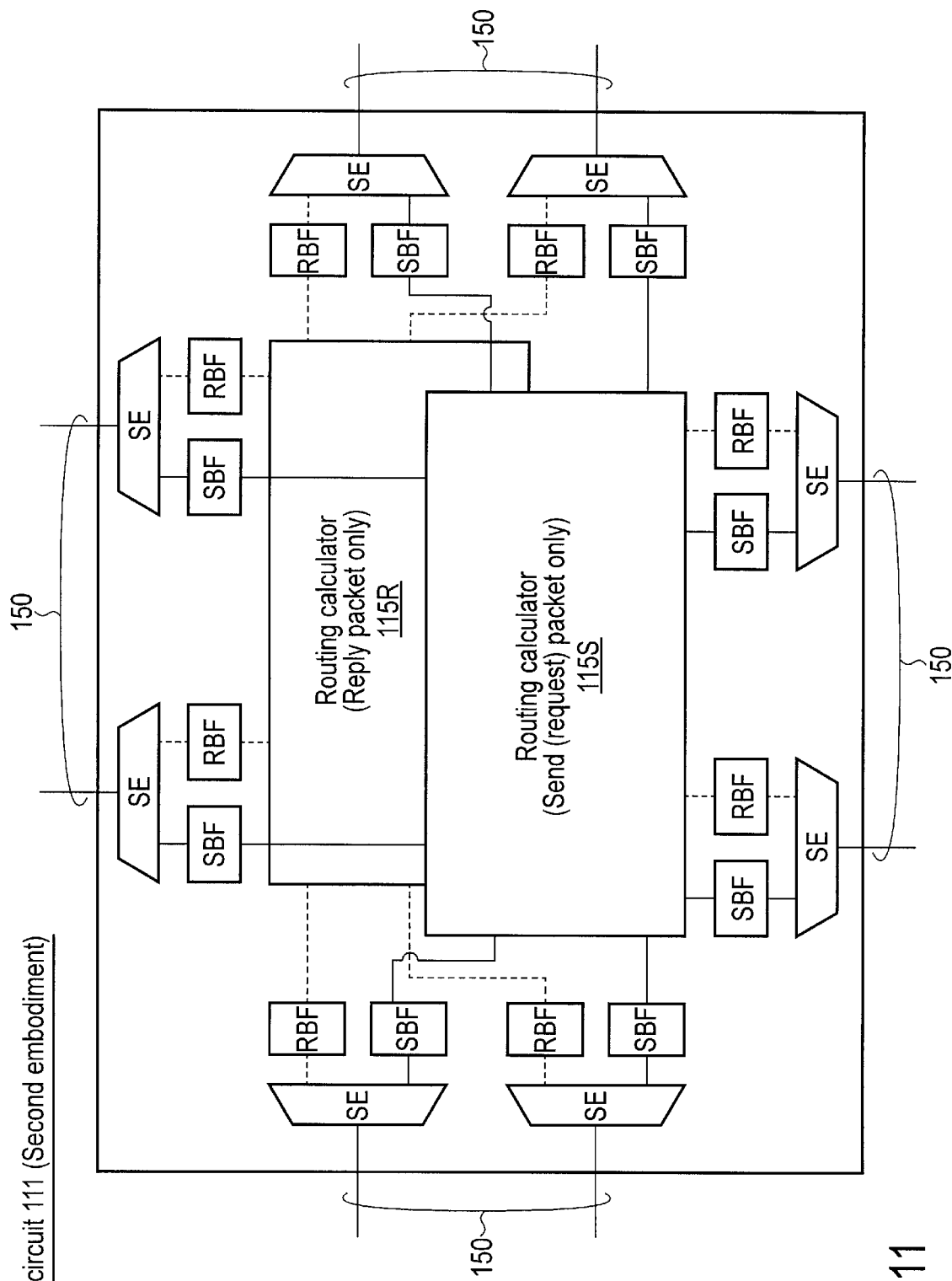
FIG. 11 is a block diagram showing configuration detail of a routing circuit according to the second embodiment.

Referring to FIG. 11, the configuration of a routing circuit 111 included in a storage system 100 according to the second embodiment is described. A broken line in FIG. 11 shows a data route of a reply packet. In this instance, a reply packet is a packet of which the direction of packet routing is towards CU 110 from NM 140, for responding to some instruction. A send packet is a packet of which the direction of packet routing is towards NM 140 from CU 110, for transmitting some instruction (request) from CU 110.

As shown in FIG. 11, the number of interfaces 150, which are the external routes of the routing circuit 111 according to the second embodiment, is kept to be the same number as the first embodiment, eight. On the other hand, the routing circuit 111 includes routing calculators 115R and 115S, buffers RBF and SBF, and a selector SE, and the number of packet processing routes in the routing circuit 111 is doubled. By utilizing the above configuration, the routing circuits 111 discriminates reply packet and send packet, and separately performs routing of each packet processing.

To be more precise, the routing circuits 111 according to the second embodiment includes two routing calculators 115R and 115S, 16 buffers RBFs and SBFs, and 8 selectors SEs.

The routing calculator 115R and eight buffers RBFs are configuration for routing reply packets. The routing calculator 115R is specialized in calculating routing of reply packets. Each buffer (reply buffer) RBF temporarily stores a reply packet.

The routing calculator 115S and eight buffers SBFs are configuration for routing send packets. The routing calculator 115S is specialized in calculating routing of send packets. Each buffer (send buffer) SBF temporarily stores a send packet.

The selector SE selects one out of two buffers, a reply buffer and a send buffer, to which a received packet should be sent in accordance with the control signal transmitted from the control unit, which is not shown in FIG. 11, of the routing circuit 111. Further details about these operations will be described later.

Note that, the other routing circuits 111 also include the same configuration as shown in FIG. 11. Since the other elements of the configuration are substantially the same to the first embodiment, they are not described in detail.

[Operation (Packet Processing Operation)]

Figure 12:
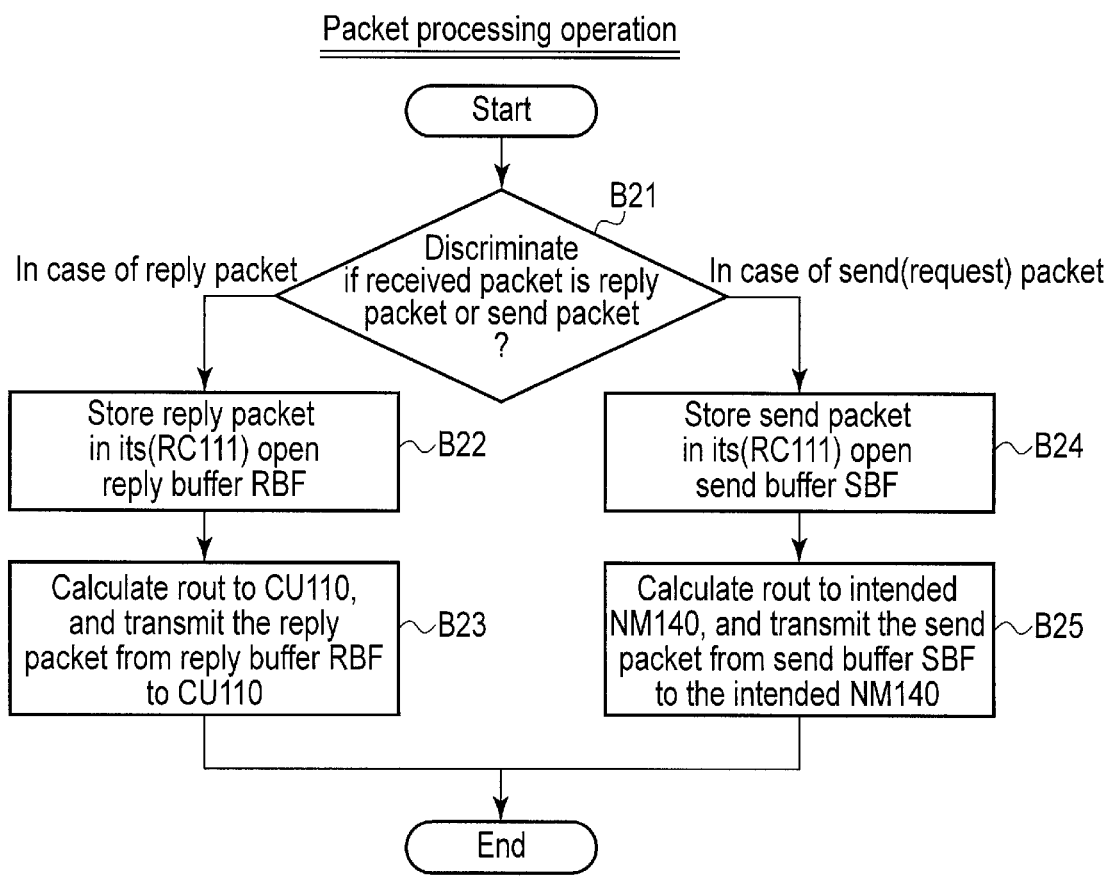
FIG. 12 is a flowchart showing a packet processing operation according to the second embodiment.

Next, referring to FIG. 12, a packet processing operation of the routing circuit 111 including the above configuration is described.

Starting with step B21, the routing circuit 111 determines if a received packet is a reply packet or a send packet. To be more precise, the routing circuit 111 determines the type of the received packet on the basis of the packet type which is described in the header area HA shown in FIG. 5. The packet type is described, for example, in a predetermined set of a plurality of bits in the header area. In step B21, the routing circuit 111 refers to a communication type of the packet types described in the header area HA, and determines that the received packet is a reply packet when the referred bit is in "1" state, meaning reply packet. Likewise, the routing circuit 111 refers to the communication type of the packet types described in the header area HA, and determines that the received packet is a send packet when the referred bit is in a "0" state, meaning send packet. On the basis of the result of judgment, the routing circuit 111 transmits a predetermined control signal to the selector SE.

(In Case of Reply Packet)

In step B22, if the received packet is a reply packet, the selector SE selects a reply packet on the basis of the control signal, and stores the reply packet in an unoccupied reply buffer RBF of its routing circuit 111.

In step B23, the reply-side routing calculator 115R calculates the route to the CU 110, and transmits the reply packet from the reply buffer RBF to the CU 110. To be more precise, the routing calculator 115R calculates the shortest route or a preferred route and such from the reply buffer RBF which stores the reply packet, to another reply buffer RBF on the route to the CU 110. Subsequently, the routing calculator 115R transfers the reply packet to the calculated route from the reply buffer RBF.

The reply packet transferred to the calculated route is then stored, for example, in an unoccupied reply buffer RBF on the calculated route. When the reply packet reaches the CU 110, the reply packet is analyzed, and the processing of the reply packet in NM 140 on the basis of the instruction from the CU 110 is completed.

(In Case of Send Packet)

In step B24, if the received packet is a send packet, the selector SE selects a send packet on the basis of the control signal, and stores the send packet in an unoccupied send buffer SBF of its routing circuit 111.

In step B25, the send-side routing calculator 115S calculates the route to an intended NM 140, and transmits the send packet from the send buffer SBF to the intended NM 140. To be more precise, the routing calculator 115S refers to the intended NM 140 and calculates the shortest route to the intended NM 140 or a preferred route and such from the send buffer SBF which stores the send packet, to another send buffer SBF on the route to the intended NM 140. Subsequently, the routing calculator 115S transfers the send packet to the calculated route from the send buffer RBF.

The send packet transferred to the calculated route is then stored, for example, in an unoccupied send buffer SBF on the calculated route. Subsequently, for example, when the send packet reaches the intended NM 140, the send packet is analyzed by a PMU 112 of the addressed NM 140. Then, on the basis of the analysis result, the instruction (for example, a data write operation) from the CU 110 is executed, and the processing of the send packet is completed.

Advantageous Effects

As described above, by utilizing the configuration and operation of the storage system 100 according to the second embodiment, the aforementioned two effects (1) and (2) are obtained. In addition, by utilizing the storage system 100 according to the second embodiment, at least the below-explained effect (3) is obtained.

(3) Preventing Occurrence of Deadlock

In the following description, the second embodiment is explained by contrast with a comparative example.

A) In Case of Comparative Example

As shown in FIG. 9, a storage system according to the comparative example does not include a routing circuit 111 as opposed to the storage system 100 according to the second embodiment. Therefore, a packet according to the comparative example is directly transferred between NMs without involving a routing circuit 111.

In such a case of the storage system according to the comparative example that plural computer nodes exchange data and commands via network, if the operation is very simple, no big problem occurs. However, when processing more complicated algorithm and such, packets storing data and commands stagnate on the network and it may lead to a phenomenon where processing stops (hereinafter referred to as "deadlock"). The mechanism of the occurrence of deadlock is precisely described below referring to FIG. 13 and FIG. 14A-14D.

Figure 13:
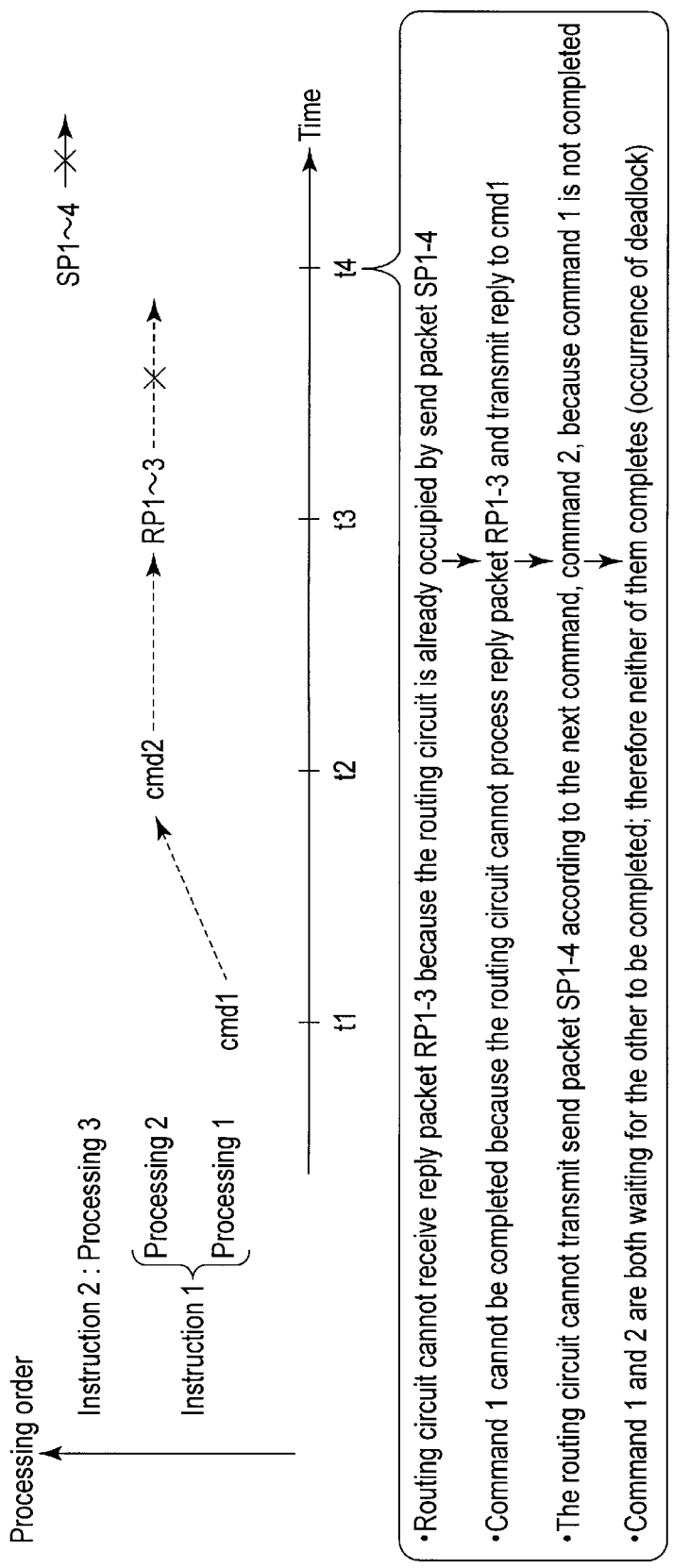
FIG. 13 is a timing chart of a packet processing according to the comparative example.
Figure 14A:
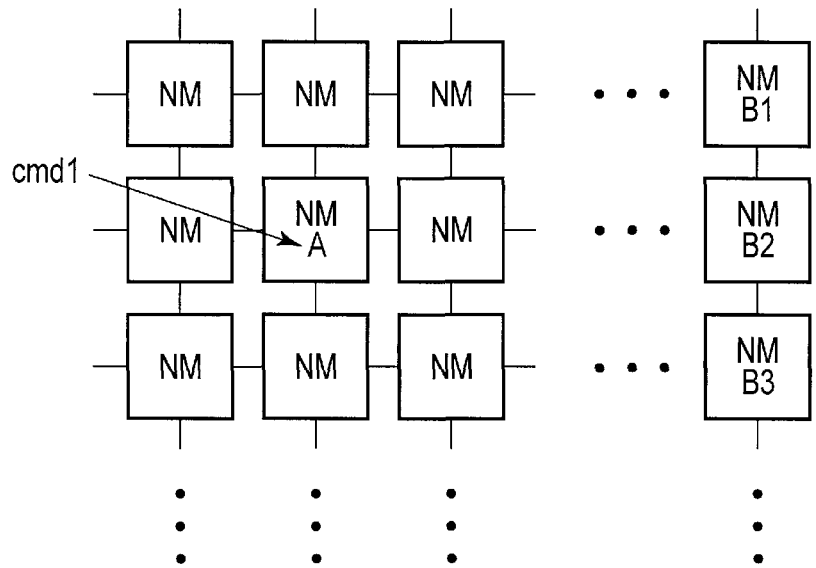
FIG. 14A is a block diagram showing the packet processing at time t1 in FIG. 13.

First, at time t1 in FIG. 13, suppose that a node module NMA according to the comparative example receives a command cmd1 for executing an instruction 1 from CU (FIG. 14A). In this instance, suppose that the instruction 1 instructs to complete two processings (processing 1 and 2) in a prescribed order. The command cmd 1 is a command for executing the above series of two processings.

Figure 14B:
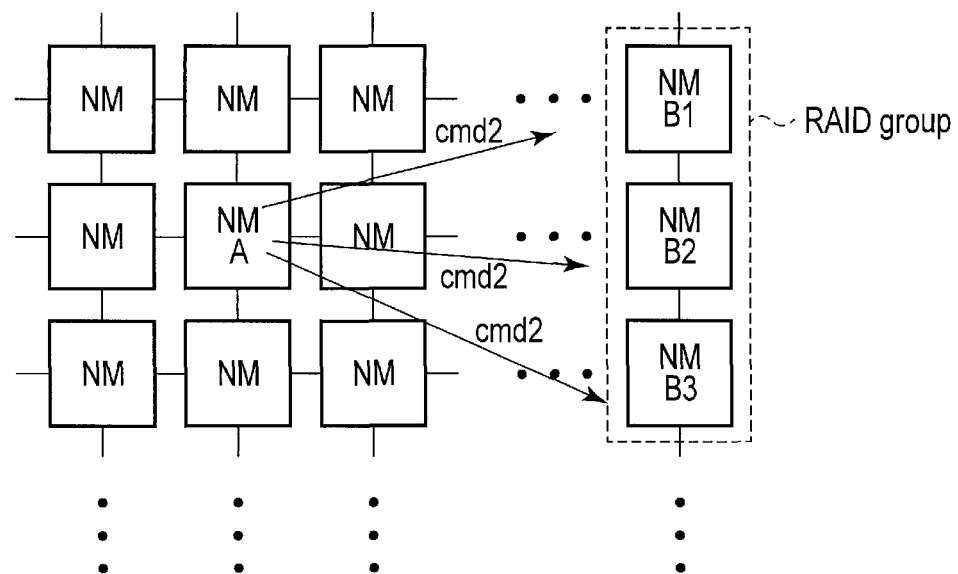
FIG. 14B is a block diagram showing the packet processing at time t2 in FIG. 13.

At time t2 in FIG. 13, the node module NMA which received the command cmd1 issues a command cmd2 regarding processing 2 to other node modules NMB1-NMB3 (FIG. 14B). In this instance, the node modules NMB1-NMB3 are, for example, a node module group configuring a predetermined RAID group. Note that, when a reply packet which was applied some processing by the node module NMA was transmitted to the CU in reply to a response of the command cmd2, a response to the first command cmd1 is completed. That is to say, in order to complete the instruction 1, the node module NMA first needs to receive the reply packets RP1-RP3 transmitted from the node modules NMB1-NMB3.

Figure 14C:
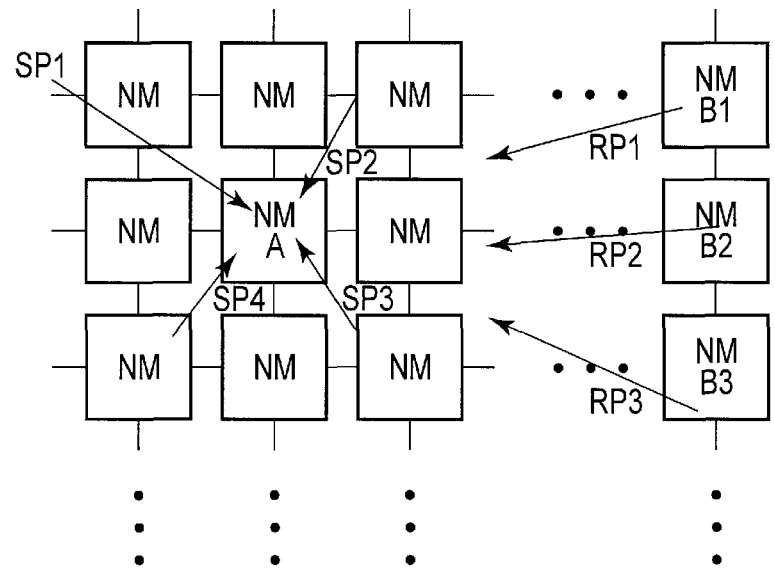
FIG. 14C is a block diagram showing the packet processing at time t3 in FIG. 13.

Consequently, at time t3 in FIG. 13, after the command cmd 2 being processed in the node modules NMB1-NMB3, the reply packets RP1-RP3, which are the responses of the command cmd2, are supposed to return to the node module NMA (FIG. 14C).

Figure 14D:
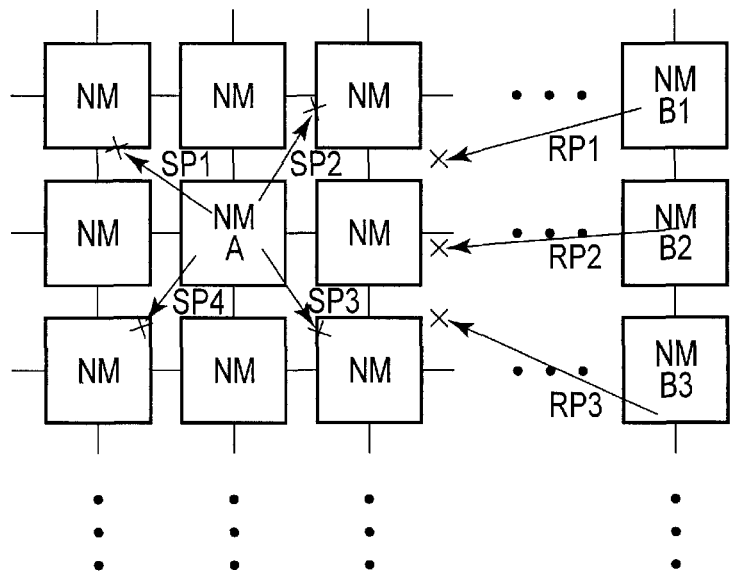
FIG. 14D is a block diagram showing the packet processing at time t4 in FIG. 13.

At time t4 in FIG. 13, suppose that the node module NMA is occupied with many send packets SP1-SP4 regarding another instruction, instruction 2, and is in a state where the node module NMA cannot receive any other packets (FIG. 14D). In this regard, in order for the node module NMA to continue on the processing, the node module NMA needs to receive the reply packets RP1-RP3 returned from the node modules NMB1-NMB3, apply the predetermined processing to the packets, and transmit the response to the command cmd1 to the CU. However, the node module NMA is in a state where it cannot receive any other packets, the instruction 1 fails to be completed. As a result, the node module NMA fails to continue on the processing (occurrence of deadlock).

In other words, at time t4 in FIG. 13, the all routes (slots) of the node module NMA to the outside are occupied by the send packets SP1-SP4 regarding instruction 2. Thus, the node module NMA fails to newly receive the reply packets RP1-RP3. As a result, the node module NMA fails to complete the instruction 1 because the node module NMA cannot process the reply packets RP1-RP3 and transmit the response to the command cmd1 to the CU. The instruction 2 also cannot be completed because the send packets SP1-SP4 cannot be transmitted due to the uncompleted instruction 1. As just described, each one of the instructions 1 and 2 is in a state of waiting for the other instruction to be processed, therefore, neither of them completes and a deadlock occurs.

Note that, when a storage system is utilized in, for example, a cloud system which is an essential information processing system, the occurrence of deadlock may lead to a stop of the whole system operation. Therefore, the occurrence of deadlock has a great effect on the reliability of the whole system.

B) In Case of the Second Embodiment

As opposed to the above-described comparative example, the storage system 100 according to the second embodiment performs packet transfer operation utilizing the routing circuit 111 whose configuration is shown in FIG. 11. The number of interfaces 150, which are the external routes of the routing circuit 111, is kept to be the same number as the first embodiment, eight. On the other hand, the routing circuit 111 includes routing calculators 115R and 115S, buffers RBF and SBF, and a selector SE, and the number of packet processing routes in the routing circuit 111 is doubled. By utilizing the above configuration, the routing circuits 111 discriminates and separates reply packet and send packet, and separately performs routing of each packet processing (FIG. 12). In this regard, "separate" means to at least differentiate the transfer routes of reply packet and send packet so that those routes mutually do not intersect in the routing circuit 111.

Figure 15:
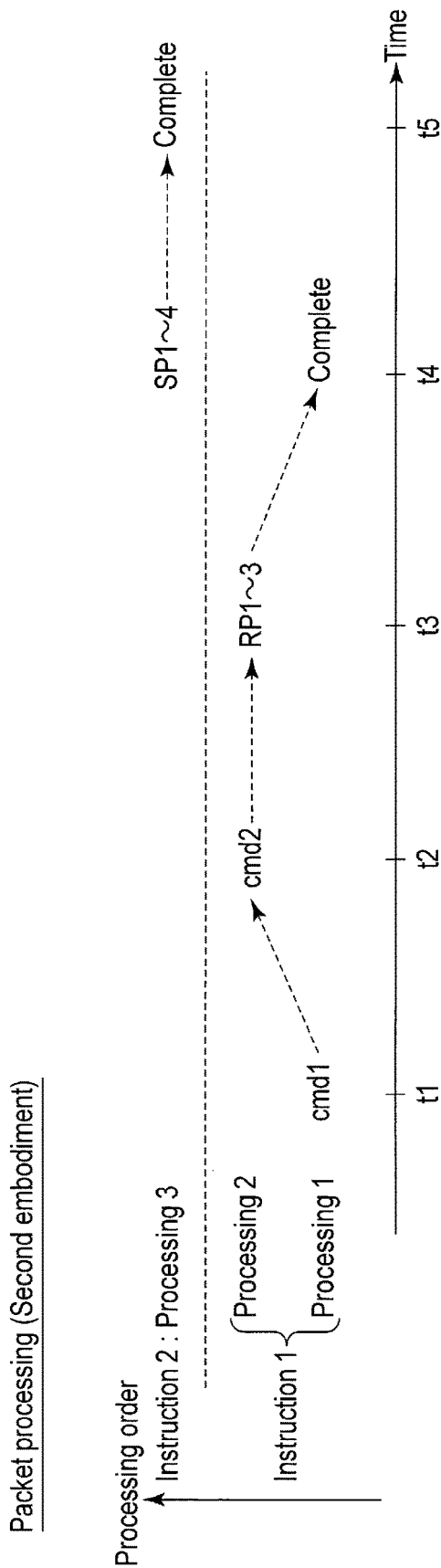
FIG. 15 is a timing chart of a packet processing according to the second embodiment.

A case of a similar packet processing as the above comparative example is described in FIG. 15. In this instance, as an example, an NM 140 is used corresponding to the node module NMA according to the comparative example.

At time t4 in FIG. 15, suppose that the NM 140 is occupied with many send packets SP1-SP4 regarding another instruction, instruction 2. In this regard, when the received packets are determined to be send packets SP1-SP4 (step B21 in FIG. 12), the selector SE selects the send packets SP1-SP4 and stores each of them to unoccupied send buffers SBFs of its routing circuit 111 (step B24 in FIG. 12).

In order for the NM 140 to continue on the processing, the NM 140 needs to receive the reply packets RP1-RP3, apply the predetermined processing to the packets, and transmit the response to the command cmd1 to the CU to complete the instruction 1.

At time t4, therefore, the routing circuit 111 of the NM 140 determines if the received packet is a reply packet or a send packet (step B21 in FIG. 12). Subsequently, the received packets are determined to be reply packets RP1-RP3, the selector SE selects the reply packets RP1-RP3, and store each of them to unoccupied reply buffers RBFs of its routing circuit 111 (step B22 in FIG. 12). Then, the reply-side routing calculator 115R calculates the route to the CU 110, and transmits the reply packets RP1-RP3 from each reply buffer RBF to the CU 110 (step B23 in FIG. 12). As a result, the instruction 1 is completed.

Next, at time t5 after the completion of the instruction 1, the send-side routing calculator 115S calculates the route to the intended NM 140, and transmits the send packets SP1-SP4 from each send buffer SBF to the intended NM 140 (step B25 in FIG. 12). As a result, the instruction 2 is completed.

As described above, by utilizing the storage system 100 according to the second embodiment, buffers (SBF and RBF) and routing calculators (115S and 115R) used are differentiated depending on the types of the received packet, a send packet or a reply packet, and separately performs routing of each packet. Therefore, as shown in FIG. 15, at least two or more packet transfer operations can be performed separately and in parallel. The storage system 100 according to the second embodiment has a merit that its configuration and operation enables to prevent occurrence of deadlock.

(Variation 2 (an Example of Other Kind of Packet))

The second embodiment covers a configuration where the routing of different types of packets, send packet and reply packet, is performed separately as an example. However, the configuration is only an example; therefore the configuration is, of course, not limited to the example according to the second embodiment, as long as the routing is performed on the basis of packet types.

For example, the routing circuit 111 can separate routing of packets on the basis of routing direction. To be more precise, in step B21 in FIG. 12, the routing circuit 111 refers to the routing direction of the packet types described in the header area HA, and determines that the received packet is a reply direction when the referred bit is in "1" state, meaning reverse direction. Likewise, the routing circuit 111 refers to the routing direction of the packet types described in the header area HA, and determines that the received packet is a send direction when the referred bit is in "0" state, meaning forward direction.

Another example, the routing circuit 111 can separate routing of packets on the basis of source types. To be more precise, in step B21 in FIG. 12, the routing circuit 111 refers to the source type of the packet types described in the header area HA, and determines that the source of the received packet is NM 140 when the referred bit is in "1" state, meaning NM 140. Likewise, the routing circuit 111 refers to the source type of the packet types described in the header area HA, and determines that the source of the received packet is CU 110 when the referred bit is in "0" state, meaning CU 110.

Moreover, the routing circuit 111 can separate routing of packets on the basis of destination types. To be more precise, in step B21 in FIG. 12, the routing circuit 111 refers to the destination type of the packet types described in the header area HA, and determines that the destination of the received packet is CU 110 when the referred bit is in "1" state, meaning CU 110. Likewise, the routing circuit 111 refers to the destination type of the packet types described in the header area HA, and determines that the destination of the received packet is NM 140 when the referred bit is in "0" state, meaning NM 140.

Note that, the criteria of separation are not limited to the above examples, for example, the routing of packets can be separated by whether the routing is in X-axis direction or not, the routing is in Y-axis direction or not, or the packet is a divided packet or not. Various criteria for separating packet routing can be utilized as needed.

Third Embodiment (Example of Redundancy, Scale-Out, Mounting, Etc.)

Next, referring to FIGS. 16 to 37, a storage system 100 according to the third embodiment will be described. The third embodiment is directed to, for example, redundancy, scale-out and mounting of the storage system 100. The storage system 100 according to the third embodiment is, for example, a storage system used in a basic information processing system, such as a cloud system, of which it is difficult to stop the system operation.

In the following description, no detailed explanation overlapping to the first embodiment is given. Furthermore, the routing circuits 111 arranged in a storage unit 101 are not shown in the drawings.

[Redundancy of Storage Unit]

First, referring to FIG. 16, an example of redundancy of the storage unit 101 will be described.

As shown, each NM 140 is mounted on a card board 20B. Four card boards 20B are connected to a backplane 220 via detachable connectors. Four NMs 140 are mounted on each of the card boards 20B. The four NMs 140 arranged in the Y-axis direction are mounted on the same card board 20B, and the four NMs 140 arranged in the X-axis direction are mounted on different card boards 20B.

In the storage unit 101, RAID (Redundant Arrays of Inexpensive Disks) can be constructed. In the example shown, four RAID groups 210 are constructed, and each NM 140 belongs to one of the four RAID groups 210. The four NMs 140 mounted on different card boards 20B constitute one RAID group 210. In this instance, the four NMs 140 arranged in the X-axis direction belong to the same RAID group 210. For example, the four NMs (0, 0), (1, 0), (2, 0) and (3, 0) arranged in the X-axis direction belong to the same RAID group 210.

The level of RAID to be applied is arbitrary. If RAID 5 is applied, when one of the NMs 140 that constitute a RAID group 210 is broken, data stored in the broken NM 140 can be recovered by replacing a card board 20B including the broken NM 140. If RAID 6 is applied, data can be recovered even when two NMs 140 that constitute a RAID group 210 are broken.

[Scale-Out of Storage Unit]

Figure 17:
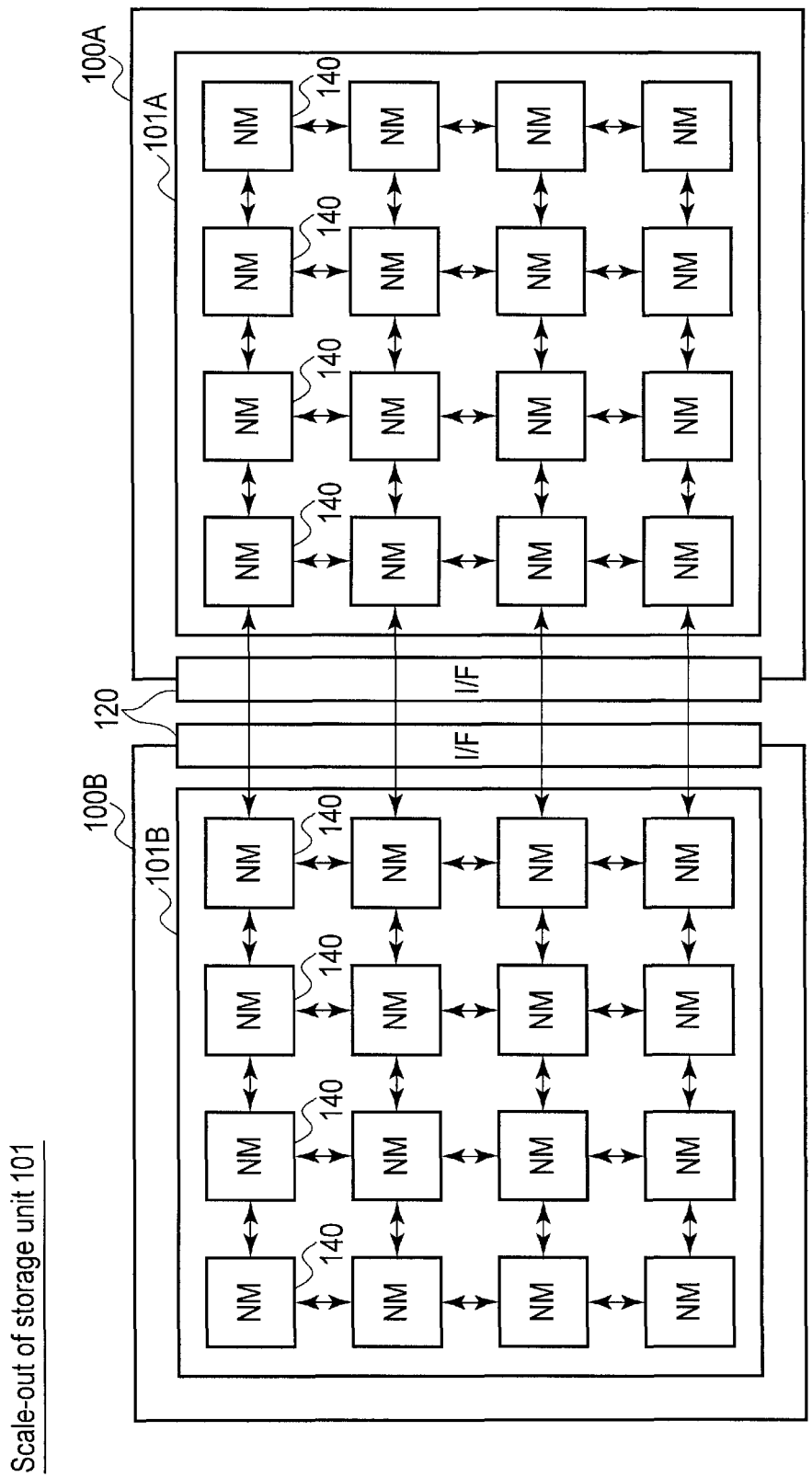
FIG. 17 is a diagram showing an example of scale-out of a storage unit according to the third embodiment.

Next, referring to FIG. 17, an example of Scale-out of the storage unit 101 will be described. I/F units 120 are connection interfaces for scaling out the storage unit 101.

In the connection relationship shown, two storage systems 100A and 100B are connected to each other via the I/F units 120. As shown, four NMs 140 of the storage system 100A and four NMs 14 of the storage system 100B are connected in one-to-one correspondence via the I/F units 120.

A packet can be transferred between the two storage systems 100A and 100B via interfaces 150 connected to the I/F units 120. Thus, two storage units 101A and 101B each including a group of 4×4 NMs are logically coupled to each other, and the coupled storage units can be used as one storage unit 101 including a group of 4×8 NMs 140.

The one of the NMs 140 that constitute the storage unit 101 which is connected to the I/F units 120, and the number of NMs 140 connected to the I/F units 120 are arbitrarily decided. The variations of the connection relationship between the storage units 101 will be described later. In the two storage units 101A and 101B, the groups of NMs 140 are directly connected to each other. More specifically, in the two storage units 101A and 101B, the groups of NMs 140 are connected to each other via routing circuits 111.

[3. Example of Mounting]

Next, an example of the above mounting configuration will be described.

[3-1. Overview]

Referring to FIG. 18, an overview of the mounting configuration will be given. FIG. 18 shows an enclosure 200 enclosing a storage system 100. The storage system 100 is enclosed in the enclosure 200 which can be mounted on a server rack 201.

The dimensions of the enclosure 200 depend upon the standard to which the server rack 201 conforms. As to the dimensions, the height of the enclosure 200 is expressed by 'U (unit).' For example, an enclosure 200 according to the third embodiment has a height of '2U' in the layer stack direction.

[3-1-1. Enclosure (Appearance)]

Figure 19:
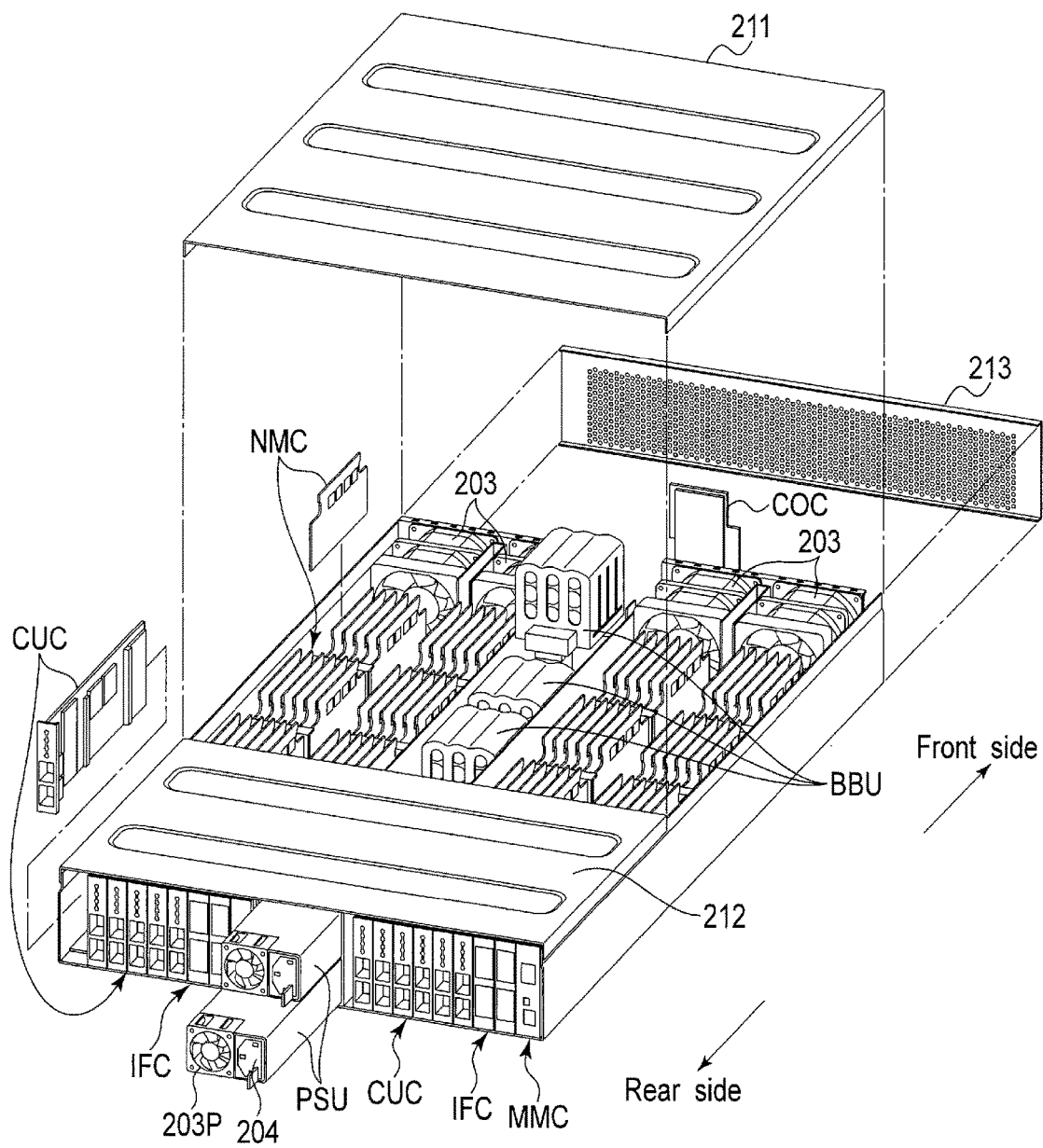
FIG. 19 is a perspective view showing an enclosure enclosing a storage system according to the third embodiment.

Next, referring to FIG. 19, the appearance of the enclosure 200 enclosing the storage system 100 will be described.

As shown, the enclosure 200 includes exterior components 211-213, node module cards (NMC), connection unit cards (CUC), interface cards (IFC), management module cards (MMC), console cards (COC), power supply units (PSU), battery backup units (BBU) and fans 203.

The exterior components 211 and 212 are provided to cover the foregoing components of the enclosure 200 in the layer stack direction, and fixed by a predetermined screw clamp or the like. The exterior component 213 is provided to cover the fronts of the foregoing components on the front side of the enclosure 200, and fixed by a predetermined screw clamp or the like.

The node module cards NMCs are card-like modules in which the above-described NMs 140, NCs 140C, routing circuits 111, PMUs 112 and CU interfaces (PCIe I/F) 113 are mounted on given card boards (circuit boards). The NMCs are attached to their respective predetermined connectors on a backplane 220 in the enclosure 200, and arranged in rows and supported in an upright position and substantially in a vertical direction. The NMCs are electrically connected to each other to configure a storage unit 101.

The connection unit cards CUCs are card-like modules in which the above connection units CU are mounted on given card boards. The CUCs are arranged in rows, and each of them is enclosed in the enclosure 200 substantially in the horizontal direction from the rear side and connected to a connector. The CUCs may be electrically connected to each other via the connectors.

The interface cards IFC are card-like modules each configured with an I/F unit 120 mounted on a given card board. The IFCs are arranged in rows and each enclosed in the enclosure 200 substantially in the horizontal direction from the rear side and attached to a connector. The IFCs may be electrically connected to each other via a connector.

The management module cards MMCs are card-like modules each configured with a management module 130 (MM) mounted on a given card board. The MMCs are arranged in rows and each enclosed in the enclosure 200 substantially in the horizontal direction from the rear side and attached to a connector. The MMCs may be electrically connected to each other via a connector.

The console cards COC include a display unit such as a display and an input/output unit such as a keyboard to input/output data to/from the foregoing components. The COCs are arranged on the surface of the enclosure 200 on the front side.

As described above, the power supply units PSU convert an external power supply voltage, which is applied from an external power supply VC through a power supply connector 204, to a predetermined DC voltage, and applies the converted power supply voltage VCO to the components. The two power supply units PSUs are enclosed in the enclosure 200 from the rear side. Each of the power supply units PSUs includes a given fan 203P. The fan 203P is operated to make it possible to supply air and radiate heat generated by the conversion or the like.

The battery backup units BBU are arranged substantially in the middle of the enclosure 200. In this regard, an example where three battery backup units BBU are arranged is given. As described above, upon receiving a power supply voltage VCO from the power supply units PSU, the battery backup units BBU charge up themselves. Then, the battery backup units BBU serve as auxiliary power supplies for applying a given auxiliary power supply voltage to each of the foregoing components when the power supply units are electrically shut off from the external power supply VC.

Eight fans 203 are arranged on the front side of the enclosure 200 and more specifically two fans are arranged for each of the four columns. Each of the fans 203 can be operated to supply air to the NMCs, CUCs, IFCs and MMCs, which are arranged in lines, and radiate heat generated from the components described above.

[3-1-2. Enclosure (Front Side)]

Figure 20:
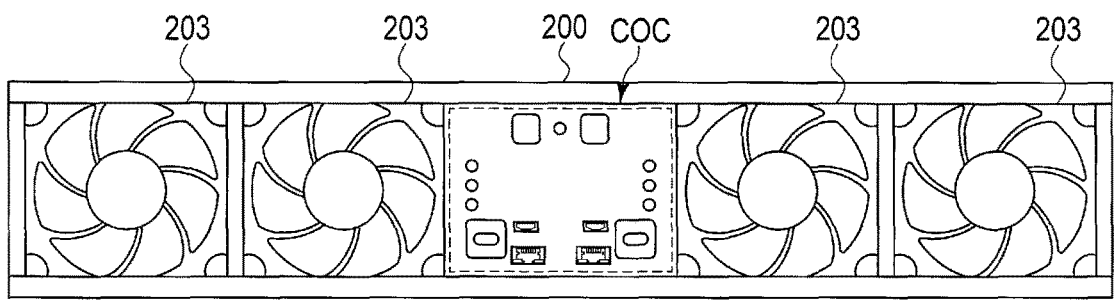
FIG. 20 is a front view of the enclosure.

Next, referring to FIG. 20, the appearance of the front side of the enclosure 200 will be described.

As shown, a COC is arranged in the middle of the front side of the enclosure 200. The COC includes a power button, different LEDs and different connectors. Two fans 203 are provided on each of the right and left sides of the COC to inhale or exhale air.

[3-1-3. Enclosure (Rear Side)]

Figure 21:
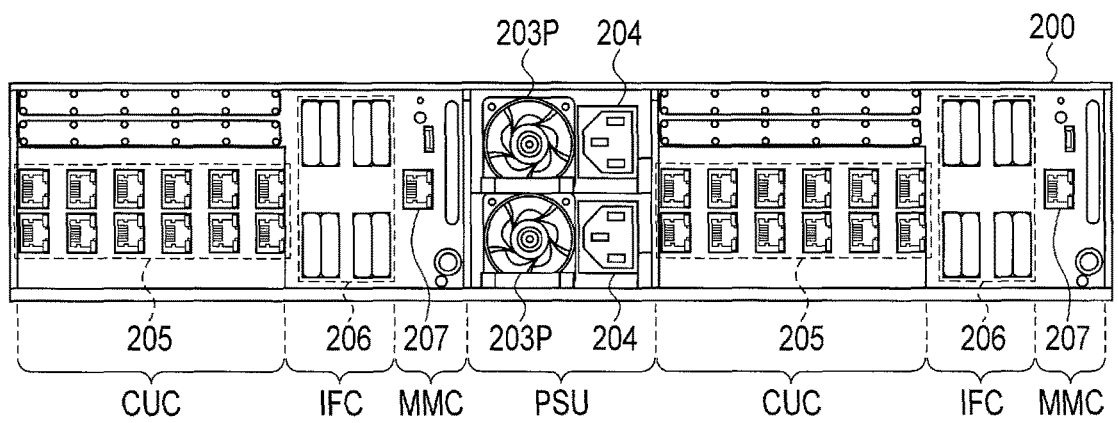
FIG. 21 is a rear view of the enclosure.

Next, referring to FIG. 21, the appearance of the rear side of the enclosure 200 will be described. Two power supply units PSU are arranged in the middle of the rear side of the enclosure 200. Each of the power supply units PSU includes a fan 203P for cooling the power supply unit PSU and a power supply connector 204.

On each of the right and left sides of the rear side, a CUC, an IFC and an MMC are arranged.

The CUC includes six pairs of connectors, twelve connectors 205 in total, through which the CUC is connected to the outside. As an example of the standard of the connectors 205, a connector that conforms to the Ethernet (registered trademark) standard will be described. An optional standard can be adopted as that of the connectors 205 if the standard allows a network connection.

The IFC includes four pairs of connectors, eight connectors 206 in total, through which the IFC is connected to the outside (another enclosure). An optional standard can be adopted as that of the connectors 206. Assume here that the above LVDS is adopted as the interfaces 150 between NMs 140, and the LVDS is adopted as the standard of the connectors 206.

The MMC includes one connector 207 through which the MMC is connected to the outside. An optional standard can be adopted as the standard of the connectors 207.

[3-1-4. Enclosure (Lear Stack Side)]

Next, referring to FIGS. 22 and 23, the appearance of the layer stack side of the enclosure 200 will be described.

Figure 22:
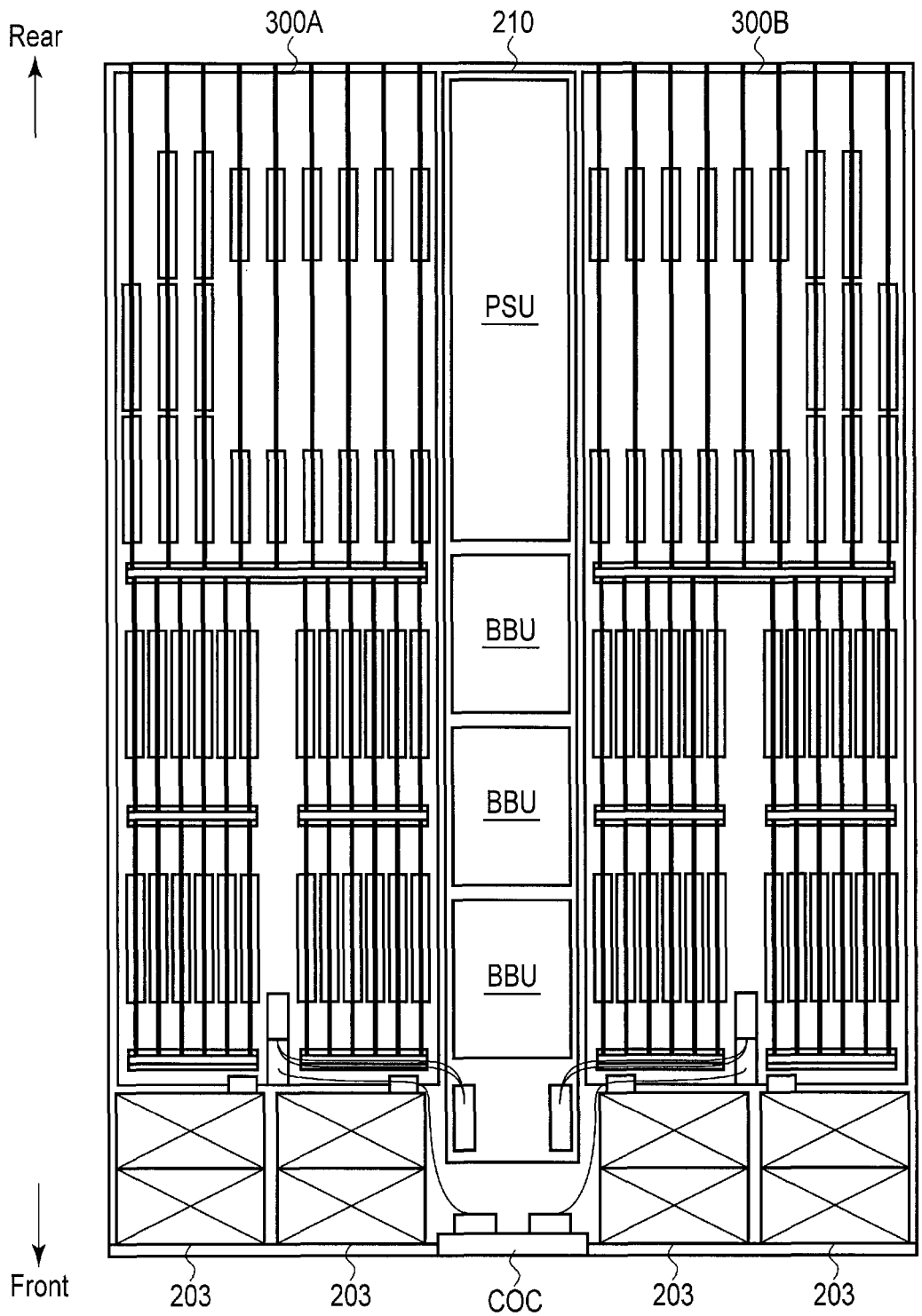
FIG. 22 is a top view of the inside of the enclosure.
Figure 23:
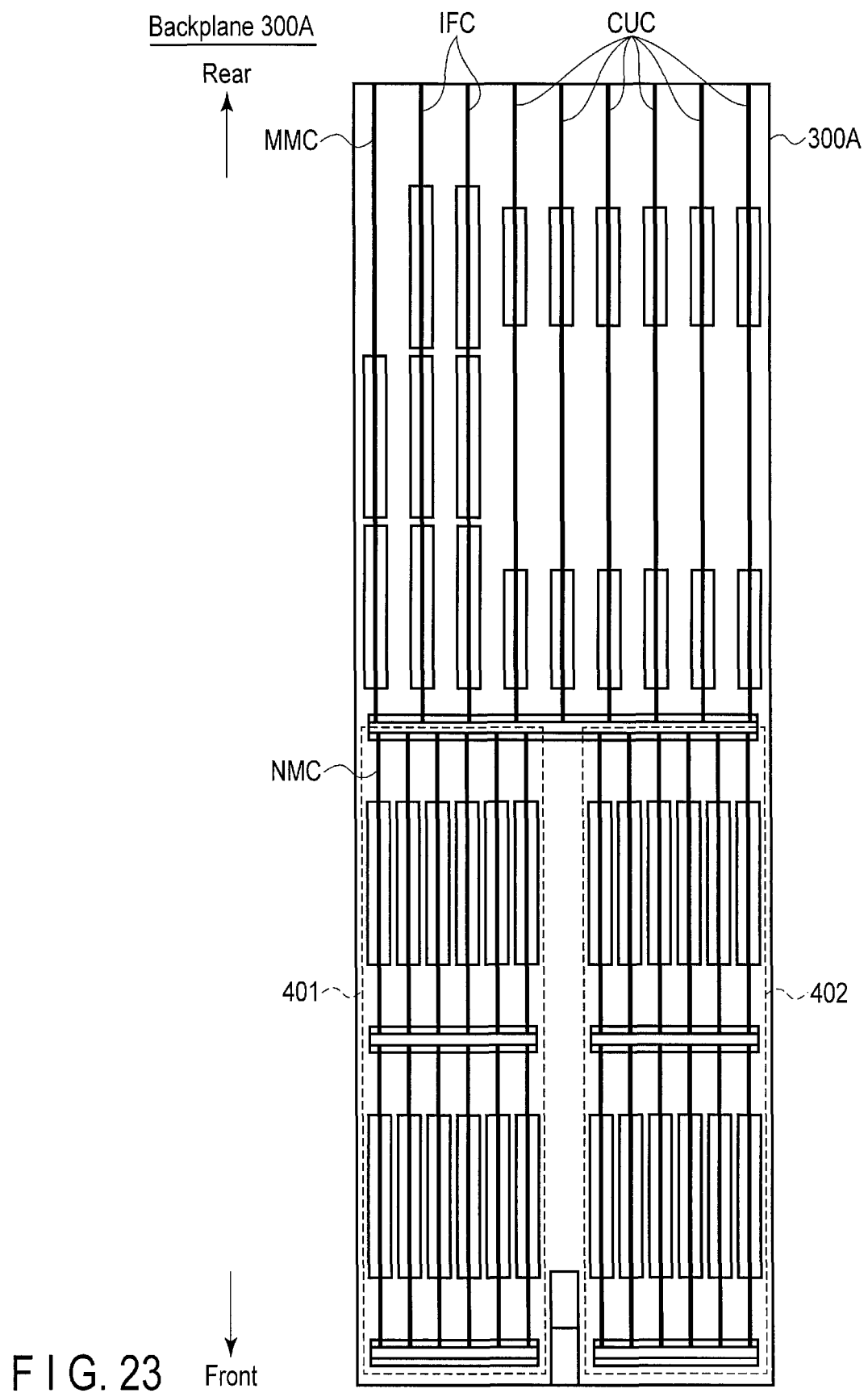
FIG. 23 is a view showing an example of a configuration of a backplane.

First, as shown in FIG. 22, a power supply backplane 210 is enclosed inside the enclosure 200 and in the middle thereof. Two backplanes 300A and 300B are enclosed in the enclosure on the left and right sides of the power supply backplane 210, respectively.

Each of the backplanes 300A and 300B is attached to a card board mounted with CUs 110, I/F units 120, MMs 130 and NMs 140. Accordingly, each of the backplanes 300A and 300B functions as one storage system 100. In other words, two storage systems 100 can be enclosed in the enclosure 200.

The enclosure 200 can be operated while enclosing one of the two backplanes 300A and 300B. When the two backplanes 300A and 300B are enclosed in the enclosure 200, they can be connected to each other through a connector 206. With this connection, the storage units 101 of the two storage systems 100 can be integrated and operated as a single storage unit 101.

In the power supply backplane 210, the two power supply units PSU are stacked one on another in the layer stack direction (height direction) of the enclosure 200 and arranged on the rear side of the enclosure 200. Furthermore, in the power supply backplane 210, three battery backup units BBU are arranged in rows on the front side of the enclosure 200. The two power supply units PSU generate an internal power supply voltage on the basis of an external power supply voltage (commercial power supply voltage) applied from outside via the power supply connector 204, and apply the generated internal power supply voltage to the two backplanes 300A and 300B through the power supply backplane 210. The three battery backup units BBU are backup power supplies which generate an internal power supply voltage when the application of a commercial power supply voltage is stopped due to a power failure or the like.

Next, referring to FIG. 23, one backplane 300A shown in FIG. 22 will be described.

As shown, CUs 110, I/F units 120, an MM 130 and NMs 140 are mounted on the respective card boards, and these card boards are inserted into slots of the backplane 300A as CUCs, IFCs, an MMC and NMCs.

For example, one MMC, two I/FCs and six CUCs are arranged in that order from the left of the backside of the backplane 300A and attached to the backside. On the front side of the backplane 300A, twenty-four NMCs are arranged in two lines and attached to the backplane. The twenty-four NMCs are classified into a block (first block 401) including twelve NMCs on the left side of FIG. 23 and a block (second block 402) including twelve NMCs on the right side thereof. This classification is based upon the attachment positions.

[3-1-5. Example of Form of Use of Enclosure]

Next, referring to FIG. 24, an example of a form of use of the enclosure 200 will be described. FIG. 24 shows an example of a form of use of the enclosure 200.

As shown, the enclosure 200 is electrically connected to a PC server 2 via connectors 205 of CUCs and a network switch (Network SW) 3 using interconnections L2 and L3.

In the above form of use, the storage system 100 enclosed in the enclosure 200 interprets a request from the PC server 2 at the CUCs and gains access to the storage unit 101. In the CUCs, a server application is executed. The PC server 2 is able to transmit a request that the server application can receive.

The connectors 205 and the network switch 3 are connected to each other for each of the CUCs. However, the enclosure is not limited to this form of use, but an arbitrary CUC can be electrically connected to the network switch 3.

[4. Configuration of Each Cards and Connection Relationship]

Next, the foregoing cards (NMC, IFC, CUC and MMC) configuring a storage system 100 enclosed in the enclosure 200 and their connection relationship will be described.

[4-1. NMC]

[4-1-1. Configuration]

Figure 26:
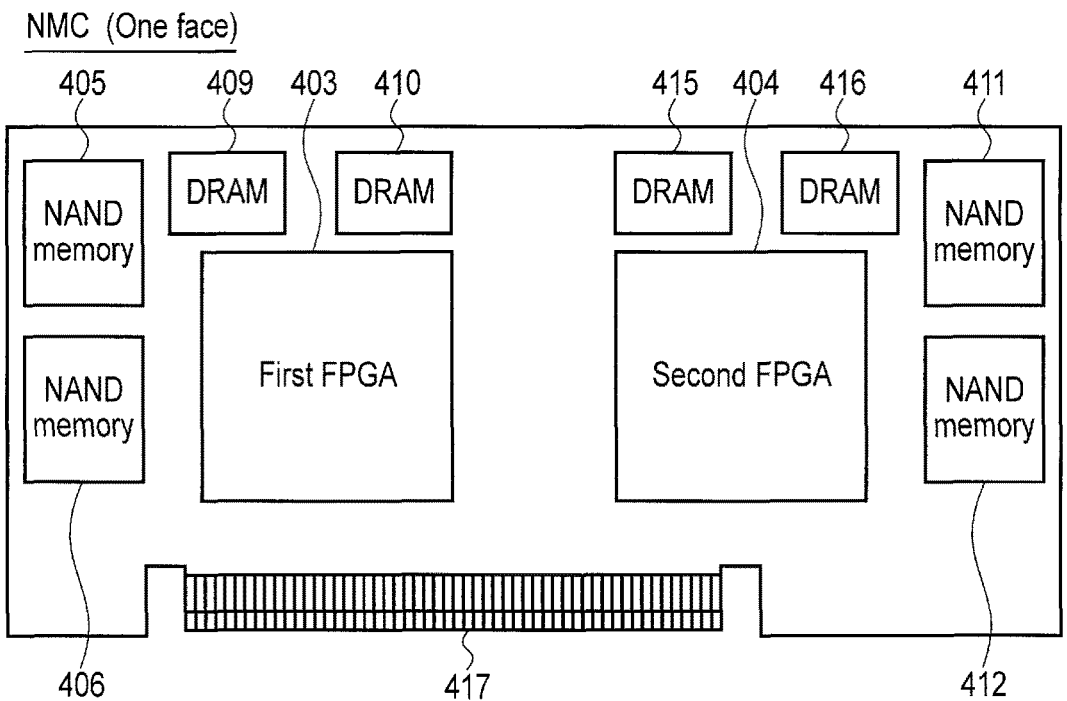
FIG. 26 is a schematic view of the NM card viewing from one side.

First, referring to FIGS. 25-27, a configuration of an NMC will be described. FIG. 25 is a block diagram showing a configuration of an NMC. FIG. 26 is a block diagram showing one surface of the NMC.

Figure 27:
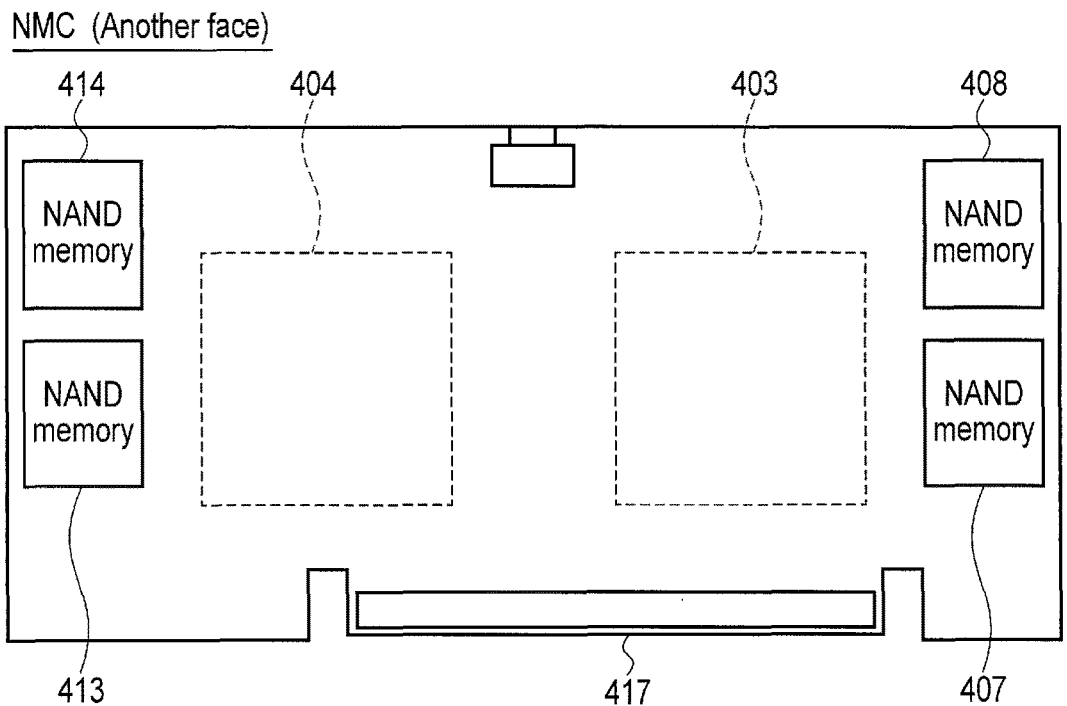
FIG. 27 is a schematic view of the NM card viewing from another side.

FIG. 27 is a block diagram showing the other surface of the NMC.

As shown in FIG. 25, the NMC includes first and second field-programmable gate arrays (FPGA) 403 and 404, NAND memories 405 to 408 and 411 to 414, DRAMs 409, 410, 415 and 416 and a connector 417.

As shown in FIGS. 26 and 27, the first FPGA 403, NAND memories 405 and 406, DRAMs 409 and 410, and NAND memories 407 and 408 are symmetrical to the second FPGA 404, NAND memories 411 and 412, DRAMs 415 and 416 and NAND memories 414 and 415, respectively.

The connector 417 is provided in a position shifted from the center of the above symmetry. The connector 417 is a connection mechanism that is physically and electrically connected to the slots on the backplane 300. The NMC can be electrically connected to another NMC to carry out communications therewith via the connector 417 and an interconnection formed in the backplane 300.

[First FPGA]

As shown in FIG. 25, the first FPGA 403 is connected to four NAND memories 405 to 408 and two DRAMs 409 and 410. The first FPGA 403 includes one routing circuit 111, five PMUs, one CU interface 113 and four NCs 140C. The four NCs 140C included in the first FPGA 403 use the DRAMs 409 and 410 as the above second memory 142.

Each of the four NCs 140C included in the first FPGA 403 uses different NAND memory of the NAND memories 405 to 408 as a first memory 141. In other words, the first FPGA 403, NAND memories 405 to 408 and DRAMs 409 and 410 correspond to one group of NMs 140 including four NCs 140C.

[Second FPGA]

The second FPGA 404 is connected to four NAND memories 411 to 414 and two DRAMs 415 and 416. The second FPGA 404 includes one routing circuit 111, five PMUs, one CU interface 113 and four NCs 140C. The four NCs 140C included in the second FPGA 404 use the DRAMs 415 and 416 as the above second memory 142.

Each of the four NCs 140 included in the second FPGA 404 uses different NAND memory of the NAND memories 411 to 414 as a first memory 141. In other words, the second FPGA 404, flash memories 411 to 414 and DRAMs 415 and 416 correspond to one group of NMs 140 including four NCs 140C.

[Interface]

The first FPGA 403 is electrically connected to the connector 417 via one PCIe interface 418 (CU interface 113) and six LVDS interfaces 419.

Similarly, the second FPGA 404 is electrically connected to the connector 417 via one PCIe interface 418 (CU interface 113) and six LVDS interfaces 419.

The first FPGA 403 and second FPGA 404 are electrically connected to each other via two LVDS interfaces 420.

The first FPGA 403 and second FPGA 404 are electrically connected to the connector 417 via an I2C interface 421.

[4-1-2. NMC (Logical Connection Relationship Between NCs)]

Figure 28:
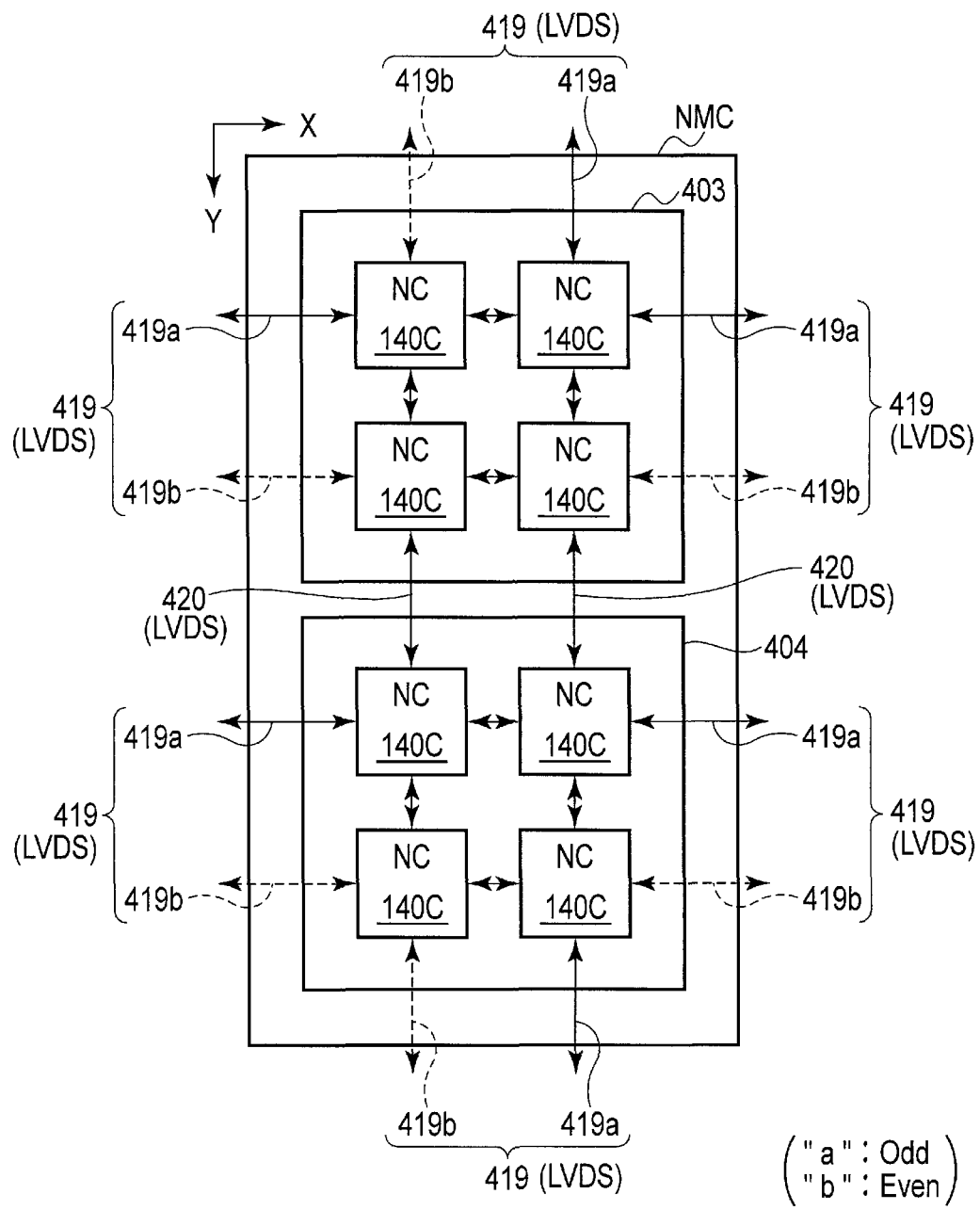
FIG. 28 is a diagram showing a logical connection relationship between NCs.

Referring to FIG. 28, a logical connection relationship between node controllers (NC) 140C in the NMC will be described in detail.

As shown, each of the NCs 140C includes four interfaces in total. Each of the NCs 140C is connected to two other NCs 140 included in the same FPGA via two interfaces in the FPGA.

Specifically, two of the four NCs 140C included in the first FPGA 403 are connected to two of the four NCs 140 included in the second FPGA 404 via the LVDS interfaces 420. By connecting those NCs 140C in the manner described above, eight NMs 140 of the NMC constitute one group of NMs 140 in four rows and two columns.

The other interfaces (LVDS interfaces 419) of each NC 140C are for connecting to NCs 140C included in FPGAs on another NMC (not shown). The NCs 140C located in the four corners of an array in four rows and two columns include two LVDS interfaces 419, and the NCs 140C located on the periphery other than the four corners include one LVDS interface 419. In other words, the NMC includes twelve LVDS interfaces 419 in total.

The LVDS interfaces 419 are used for connecting the NMC to another NMC. An NC 140C located on the positive side ("X+" direction) in the X-axis direction can be connected to an NC 140C on another NMC logically adjacent thereto in the "X+" direction. An NC 140C located on the negative side ("X−" direction) in the X-axis direction can be connected to an NC 140C on another NMC logically adjacent thereto in the "X−" direction. An NC 140C located on the positive side ("Y+" direction) in the Y-axis direction can be connected to an NC 140 on another NMC logically adjacent thereto in the "Y+" direction. An NC 140C located on the negative side ("Y−" direction) in the Y-axis direction can be connected to an NC 140 on another NMC logically adjacent thereto in the "Y−" direction.

[Odd Group/Even Group]

In the third embodiment, the twelve LVDS interfaces 419 of the NMC are described by dividing them into two groups of an odd group and an even group.

Hereinafter, the LVDS interfaces 419 of the odd group will be referred to as LVDS interfaces 419a. The LVDS interfaces 419 of the even group will be referred to as LVDS interfaces 419b.

In FIG. 28, the solid lines indicate the LVDS interfaces 419a belonging to the odd group and the broken lines indicate the LVDS interfaces 419b belonging to the even group. As shown, the twelve LVDS interfaces 419 are divided in each of the "X+," "X−," "Y+" and "Y−" directions so that the number of LVDS interfaces in the odd and even groups will be equal.

[4-2. IFC]

[4-2-1. Configuration]

Next, referring to FIG. 29, a configuration of the IFC will be described. FIG. 29 is a block diagram showing a configuration of the IFC.

As shown, the IFC includes connectors 509 and 206, LVDS buffers 501 and 502 and capacitors 503 and 504.

The connector 509 is a connection mechanism that is physically and electrically connected to the slots on the backplane 300. The IFC is electrically connected to the NMC, different cards and the like via the connector 509 and the interconnection on the backplane 300.

The connector 206 is a connection mechanism that is electrically connected to the storage system 100 enclosed in another enclosure 200 via another IFC, as described above. The connector 206 includes four connectors 505 to 508. The connectors 505 and 506 include a detachable mechanism which enables to detach at the same time, and the connectors 507 and 508 include a detachable mechanism which enables to detach at the same time.

The connector 505 is an LVDS cable connector including terminals of the "X+" direction LVDS interfaces 419. The connector 506 is an LVDS cable connector including terminals of the "X−" direction LVDS interfaces 419. The connector 507 is an LVDS cable connector including terminals of the "Y+" direction LVDS interfaces 419. The connector 508 is an LVDS cable connector including terminals of the "Y−" direction LVDS interfaces 419.

The "X+" direction LVDS interfaces 419 and the "X−" direction LVDS interfaces 419 are connected to the connectors 505 and 506 respectively, via the connector 509, LVDS buffer 501 and capacitor 503.

The "Y+" direction LVDS interfaces 419 and the "Y−" direction LVDS interfaces 419 are connected to the connectors 507 and 508 respectively, via the connector 509, LVDS buffer 502 and capacitor 504.

As described above, two IFCs are attached to each of the backplanes 300. One of the two IFCs attached to each of the backplanes 300 belongs to the odd group only, and the other belongs to the even group only.

[4-2-2. Connection Relationship Between IFC and NMC]

Figure 30:
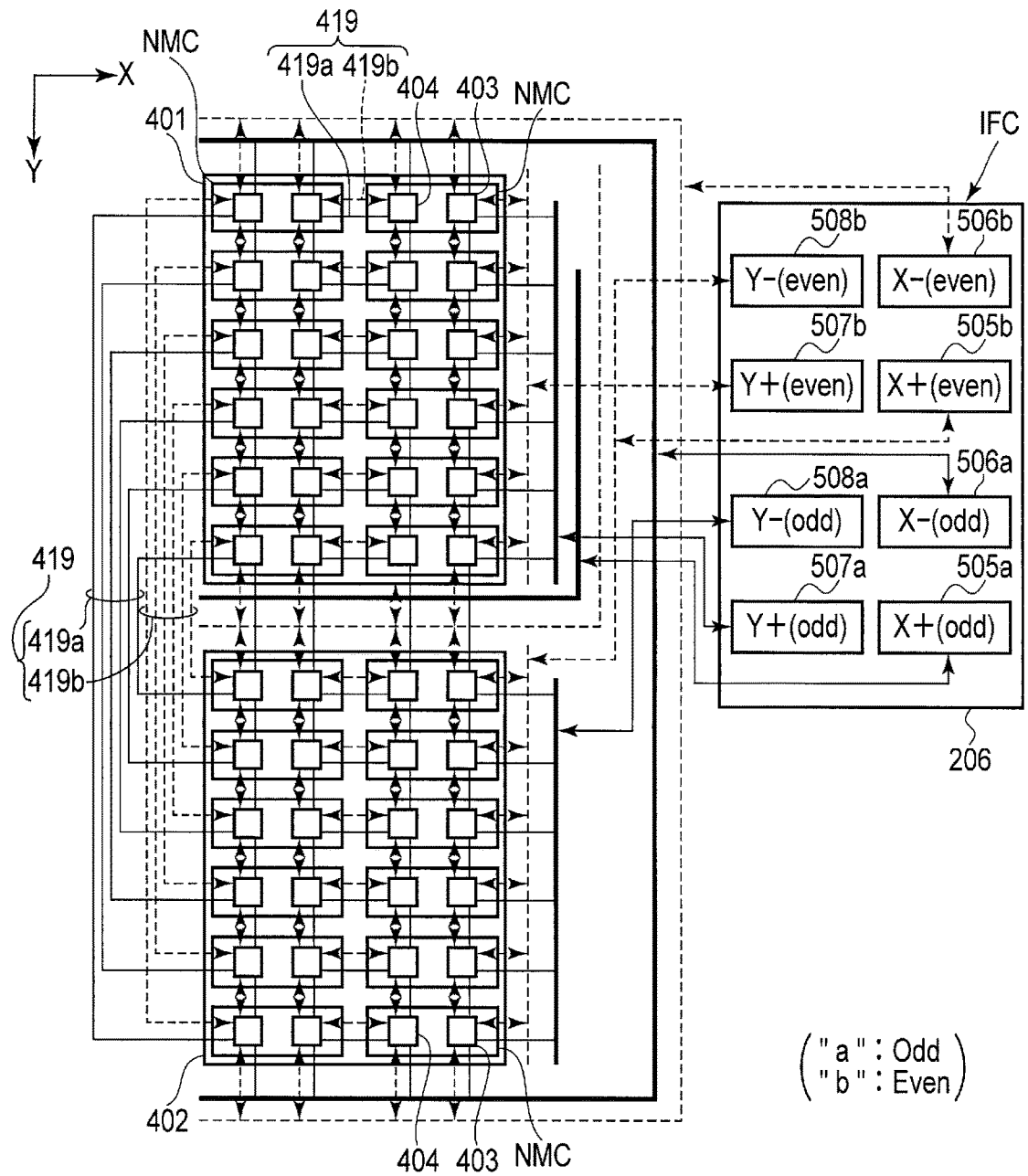
FIG. 30 is a diagram showing a connection relationship between the NM card and the I/F card.

Referring to FIG. 30, a connection relationship between the IFC and the NMC will be described. FIG. 30 is a diagram showing an electrical connection relationship between the IFC and the NMC. The connectors are distinguished from each other by adding a suffix "a" to the reference numerals of connectors belonging to the odd group and adding a suffix "b" to the reference numerals of connectors belonging to the even group.

As shown in FIG. 30, two NMCs, which are physically adjacent to each other in the X-axis direction, are connected to each other via one LVDS interface 419a and one LVDS interface 419b in each of the first and second blocks 401 and 402.

Two NMCs, which are physically adjacent to each other in the Y-axis direction, are connected to each other via two LVDS interfaces 419a and two LVDS interfaces 419b in each of the first and second blocks 401 and 402.

The NMCs inserted in the lower layer of the first block 401 are connected to the NMCs inserted in the lower layer of the second block 402 in one-to-one correspondence via one LVDS interface 419a and one LVDS interface 419b.

The i-th NMC from the left of FIG. 30 in the lower layer of the first block 401 is connected to the i-th NMC from the right of FIG. 30 in the lower layer of the second block 402.

[Logical Connection Relationship Between NMC and IFC]

With the foregoing physical connection, the first block 401 and the second block 402 logically differ in definitions of the X-axis direction and the Y-axis direction. To be more precise, in the first block 401, the rightward direction in FIG. 30 corresponds to the "X+" direction, and in the second block 402, the leftward direction in FIG. 30 corresponds to the "X+" direction. In the first block 401, the upward direction in FIG. 30 corresponds to the "Y+" direction, and in the second block 402, the downward direction in FIG. 30 corresponds to the "Y+" direction.

Thus, among the "X+" direction LVDS interfaces 419 of the NMCs inserted at the right end of the first block 401 and the NMCs inserted at the left end of the second block 402, the LVDS interfaces 419a belonging to the odd group are connected to the connector 505a.

Among the "X+" direction LVDS interfaces 419 of the NMCs inserted at the right end of the first block 401 and the NMCs inserted at the left end of the second block 402, the LVDS interfaces 419b belonging to the even group are connected to the connector 505b.

Among the "X−" direction LVDS interfaces 419 of the NMCs inserted at the left end of the first block 401 and the NMCs inserted at the right end of the second block 402, the LVDS interfaces 419b belonging to the odd group are connected to the connector 506a.

Among the "X−" direction LVDS interfaces 419 of the NMCs inserted at the left end of the first block 401 and the NMCs inserted at the right end of the second block 402, the LVDS interfaces 419b belonging to the even group are connected to the connector 506b.

Among the "Y+" direction LVDS interfaces 419 of the NMCs inserted in the upper layer of the first block 401, the LVDS interfaces 419a belonging to the odd group are connected to the connector 507a.

Among the "Y+" direction LVDS interfaces 419 of the NMCs inserted in the upper layer of the first block 401, the LVDS interfaces 419b belonging to the even group are connected to the connector 507b.

Among the "Y−" direction LVDS interfaces 419 of the NMCs inserted in the upper layer of the second block 402, the LVDS interfaces 419a belonging to the odd group are connected to the connector 508a.

Among the "Y−" direction LVDS interfaces 419 of the NMCs inserted in the upper layer of the second block 402, the LVDS interfaces 419b belonging to the even group are connected to the connector 508b.

[4-3. CUC (Configuration)]

Figure 31:
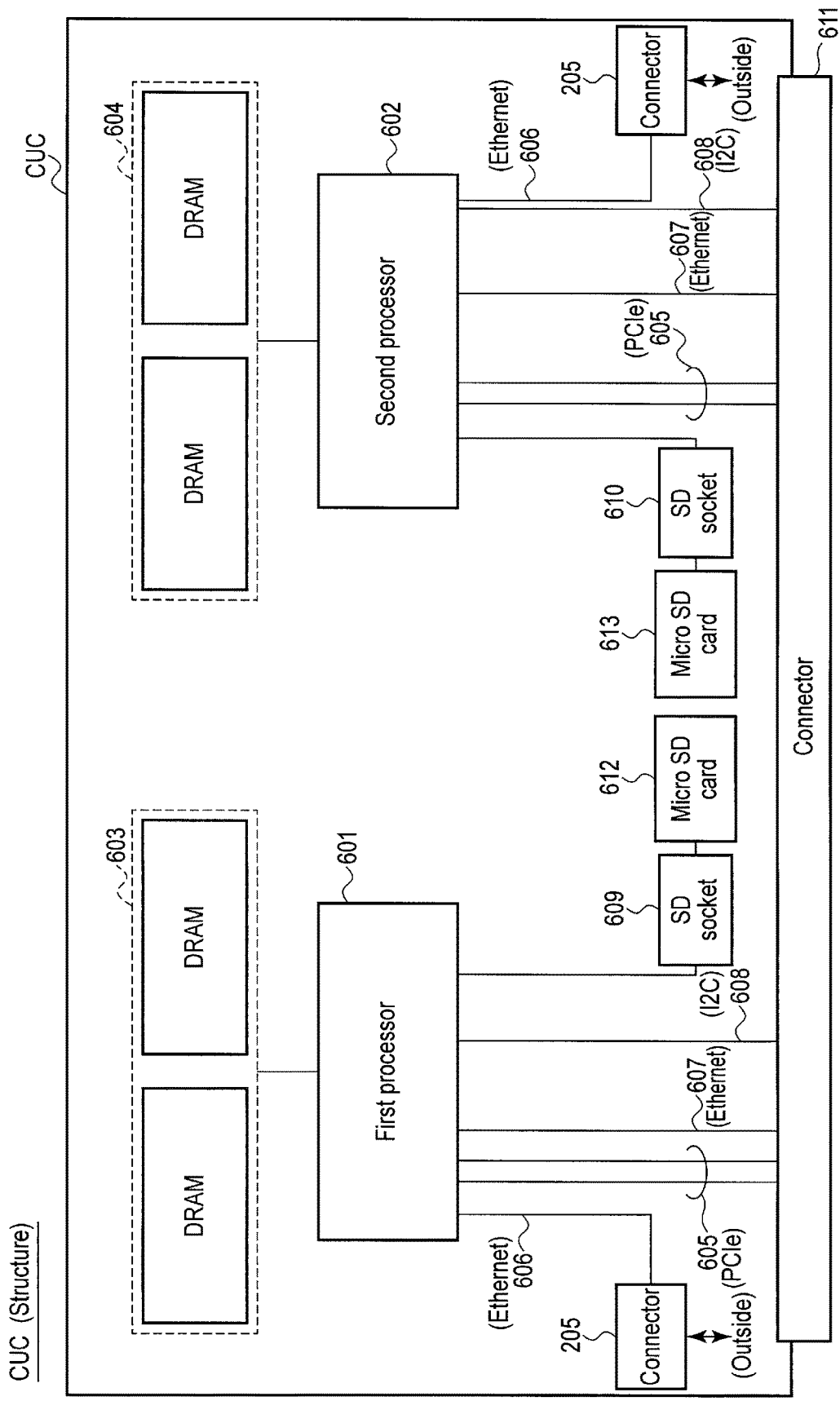
FIG. 31 is a block diagram showing an example configuration of a CU card.

Next, a configuration of the CUC will be described with reference to FIG. 31. FIG. 31 is a block diagram showing a configuration of the CUC.

As shown, the CUC includes a connector 611, first and second processors 601 and 602, DRAMs 603 and 604, two connectors 205 and SD sockets 609 and 610.

The connector 611 is a connection mechanism that is physically and electrically connected to the slots on the backplane 300. The CUC is able to carry out communications with another MMC and another NMC via the connector 611 and an interconnection formed on the backplane 300.

The first and second processors 601 and 602 execute their respective programs and each serve as a CU 110. In other words, one CUC corresponds to two CUs 11.

The first processor 601 is connected to the DRAM 603, and the DRAM 603 is used as a work area. The first processor 601 is connected to the SD socket 609. A Micro SD card 612, which previously stores programs to be executed by the first processor 601, is connected to the SD socket 609.

The first processor 601 is connected to one of the two connectors 205 via an interface 606 that conforms to the Ethernet standard. The first processor 601 is connected to the outside via the connector 205. The first processor 601 is also connected to the connector 611 via two PCIe interfaces 605. The first processor 601 is also connected to the connector 611 via one interface 607 that conforms to the Ethernet standard. Further, the first processor 601 is connected to the connector 611 via one I2C interface 608. The first processor 601 is also connected to the above NMC and MMC via the connector 611.

Similarly, the second processor 602 is connected to the DRAM 604, and the DRAM 604 is used as a work area. The second processor 602 is connected to the SD socket 610. A Micro SD card 613, which previously stores programs to be executed by the second processor 602, is connected to the SD socket 610.

Similarly, the second processor 602 is connected to one of the two connectors 205 via an interface 606 that conforms to the Ethernet standard. The second processor 602 is also connected to the connector 611 via two PCIe interfaces 605. The second processor 602 is connected to the outside via the connector 205. The second processor 602 is also connected to the connector 611 via one interface 607 that conforms to the Ethernet standard. Further, the second processor 602 is connected to the connector 611 via one I2C interface 608. The second processor 602 is also connected to the above NMC and MMC via the connector 611.

[4-4. MMC]

[4-4-1. Configuration]

Figure 32:
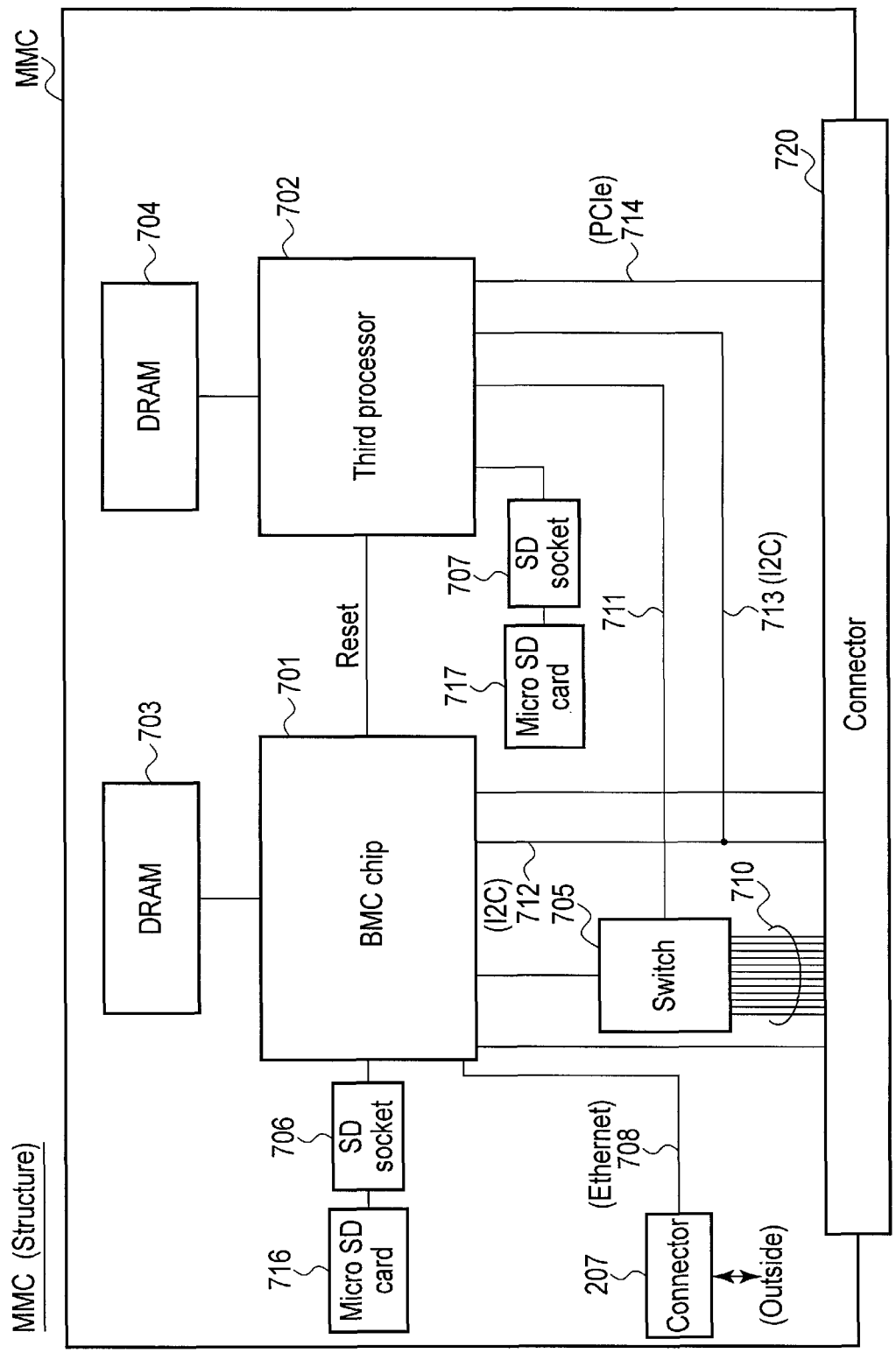
FIG. 32 is a block diagram showing an example configuration of an MM card.

Next, a configuration of the MMC will be described with reference to FIG. 32. FIG. 32 is a block diagram showing a configuration of the MMC.

As shown, the MMC includes a connector 720, a BMC chip 701, a third processor 702, DRAMs 703 and 704, a switch 705, a connector 207 and SD sockets 706 and 707.

The connector 720 is a connection mechanism that is physically and electrically connected to the slots on the backplane 300. The MMC 700 carries out communications with another MMC and another CUC via the connector 720 and an interconnection formed on the backplane 300.

[BMC Chip]

The BMC chip 701 is a chip that fulfills the functions of the above BMC. The BMC chip 701 is connected to the DRAM 703, and the DRAM 703 is used as a work area. The BMC chip 701 is connected to the SD socket 706. The BMC chip 701 is able to record different items of monitoring data on a Micro SD card 716 connected to the SD socket 706. The BMC chip 701 is connected to the connector 207 via an interface 708 that conforms to the Ethernet standard and is able to carry out communications with the outside via the connector 207.

[Third Processor]

The third processor 702 performs an NM control processing for the storage unit 101 on the basis of programs. The third processor 702 is connected to the DRAM 704, and the DRAM 704 can be used as a work area. The third processor 702 is connected to the SD socket 707. A Micro SD card 717, which previously stores programs to be executed by the third processor 702, is connected to the SD socket 707.

The switch 705 is connected to the connector 720 via twelve interfaces 710, connected to the third processor 702 via one interface 711, and connected to the BMC chip 701 via one interface. The interfaces connected to the switch 705 conform to the Ethernet standard. The twelve interfaces 710 are connected to the processors (first processor 601, second processor 602) mounted on the CUC via the connector 720 and backplane 300. The switch 705 relays communications between the BMC chip 701 and the first, second and third processors 601, 602 and 702. The BMC chip 701 is able to acquire information generated by each of the processors, via the switch 705.

The BMC chip 701 is connected to the connector 720 via an I2C interface 712. The I2C interface 712 is branched to an I2C interface 713 on its way. The I2C interface 713 is connected to the third processor 702. The terminal alongside the connector 720 of the I2C interface 712 is connected to the first processor 601, second processor 602, first FPGA 403 and second FPGA 404 through the backplane 300 and the connectors of different cards. The BMC chip 701 monitors the first processor 601, the second processor 602, the first FPGA 403, and the second FPGA 404 via the I2C interface 712. The monitoring data transmitted from the first processor 601, second processor 602, first FPGA 403 and second FPGA 404 is also referred to from the third processor 702 via the I2C interface 713. The third processor 702 is able to perform an NM control processing using the monitoring data.

The third processor 702 is connected to the connector 720 via a PCIe interface 714. The terminal alongside the connector 720 of the PCIe interface 714 is connected to one NMC through the backplane 300. The third processor 702 transmits a packet for an arbitrary NC 140 to the PCIe interface 714 and receives a packet from an arbitrary NC 140 via the PCIe interface 714.

[4-4-2. Relationship in Connection Between MMC, CUC and NMC]

Figure 33:
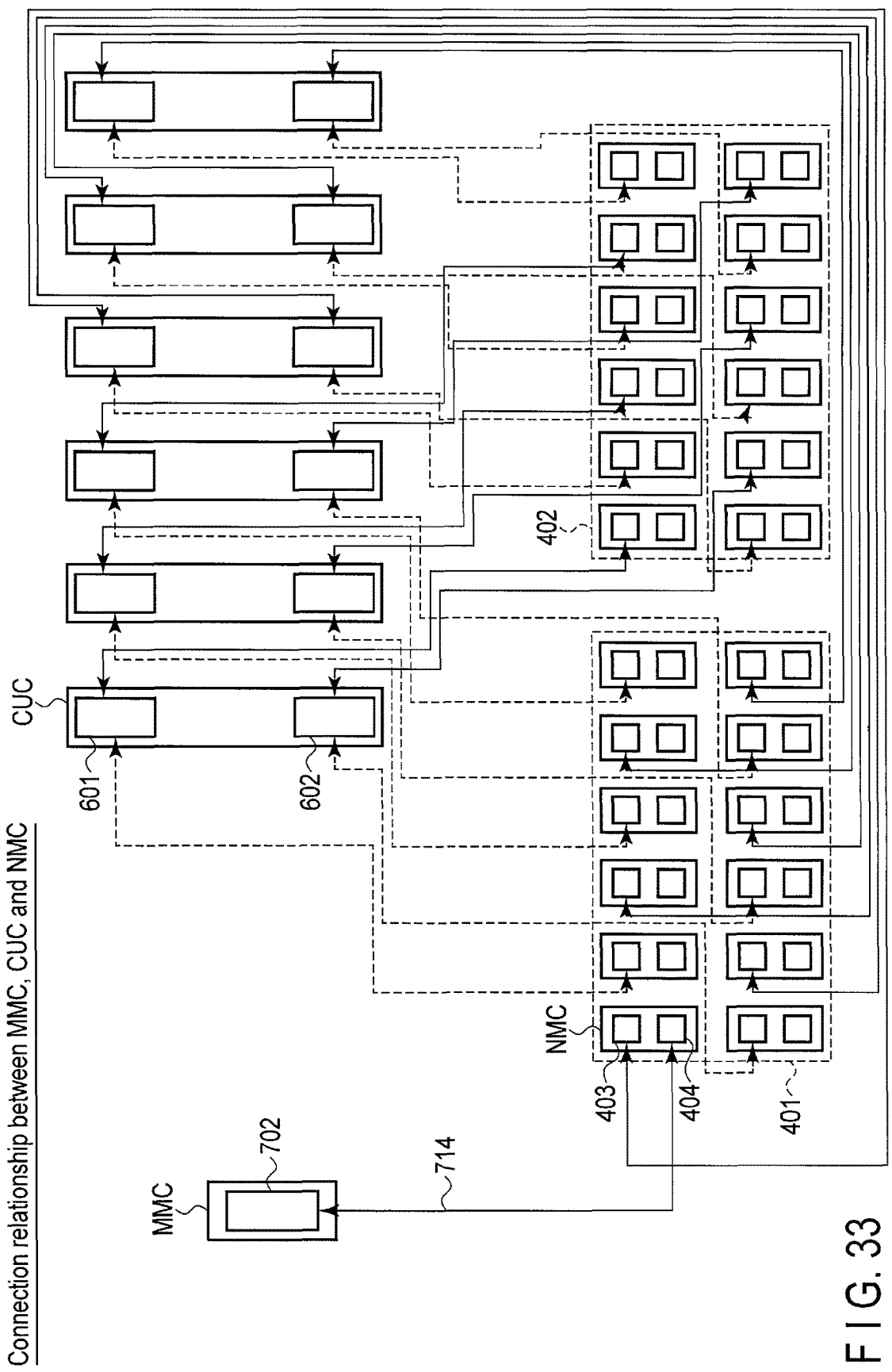
FIG. 33 is a diagram showing a connection relationship between the NM card, the CU card and the MM card.

Next, a relationship in connection between the MMC, CUC and NMC will be described with reference to FIG. 33. FIG. 33 is a diagram showing a relationship in connection between the NMC, CUC and MMC. The connections shown in this figure are all made by the PCIe interface. Furthermore, the relationship in connection shown in the figure is achieved by the interconnection in each of the cards and the interconnection formed in the backplane 300.

As described above, each CUC includes four PCIe interfaces 605 and each NMC includes two PCIe interfaces 418. The four PCIe interfaces 605 are used for connection to different NMCs and thus each CUC is connected to four NMCs. One of the two PCIe interfaces 418 is used to connect each NMC to the CUC. Here, the PCIe interface 418 of the first FPGA 403 is used for connection to the CUC.

The first processors 601 of the left three CUCs shown in the figure are connected to different NMCs inserted in the upper layer of the first block 401 and different NMCs inserted in the upper layer of the second block 402. The second processors 602 of the left three CUCs shown in the figure are connected to different NMCs inserted in the lower layer of the first block 401 and different NMCs inserted in the lower layer of the second block 402.

The first processors 601 of the right three CUCs shown in the figure are connected to both different NMCs inserted in the upper player of the first block 401 and different NMCs inserted in the upper layer of the second block 402. The second processors 602 of the right three CUCs shown in the figure are connected to different NMCs inserted in the lower layer of the first block 401 and different NMCs inserted in the lower layer of the second block 402.

As has been described above, each CUC is connected to both the NMCs belonging to the first block 401 and the NMCs belonging to the second block 402. Thus, even though NMCs are inserted in only one of the first and second blocks 401 and 402, each CUC is able to cause the inserted NMCs to fulfill the function of the CU 11. Furthermore, irrespective of whether NMCs are inserted in both the first block 401 and the second block 402, the CUCs the number of which is any one from one to six can be operated.

As will be described below, the MMC is connected to only one NMC belonging to the first block 401 and thus the enclosure 200 is operated while the NMCs are connected to at least the first block 401. When the MMC is connected to an arbitrary NMC belonging to the second block 402, the enclosure 200 can be operated while the NMC is inserted into only the second block 402.

The MMC includes one PCIe interface 714. When the PCIe interface 714 is used, the MMC is connected to one NMC. In the NMC, the PCIe interface 418 of the second FPGA 404 is used for connection to the MMC. The MMC is connected to an NMC inserted in the upper leftmost part of the first block 401. The MMC is able to transmit and receive a packet via the PCIe interface 714.

[4-4-3. Relationship in Connection Between MMC and CUC]

Next, a relationship in connection between the MMC and CUC will be described with reference to FIG. 34.

Figure 34:
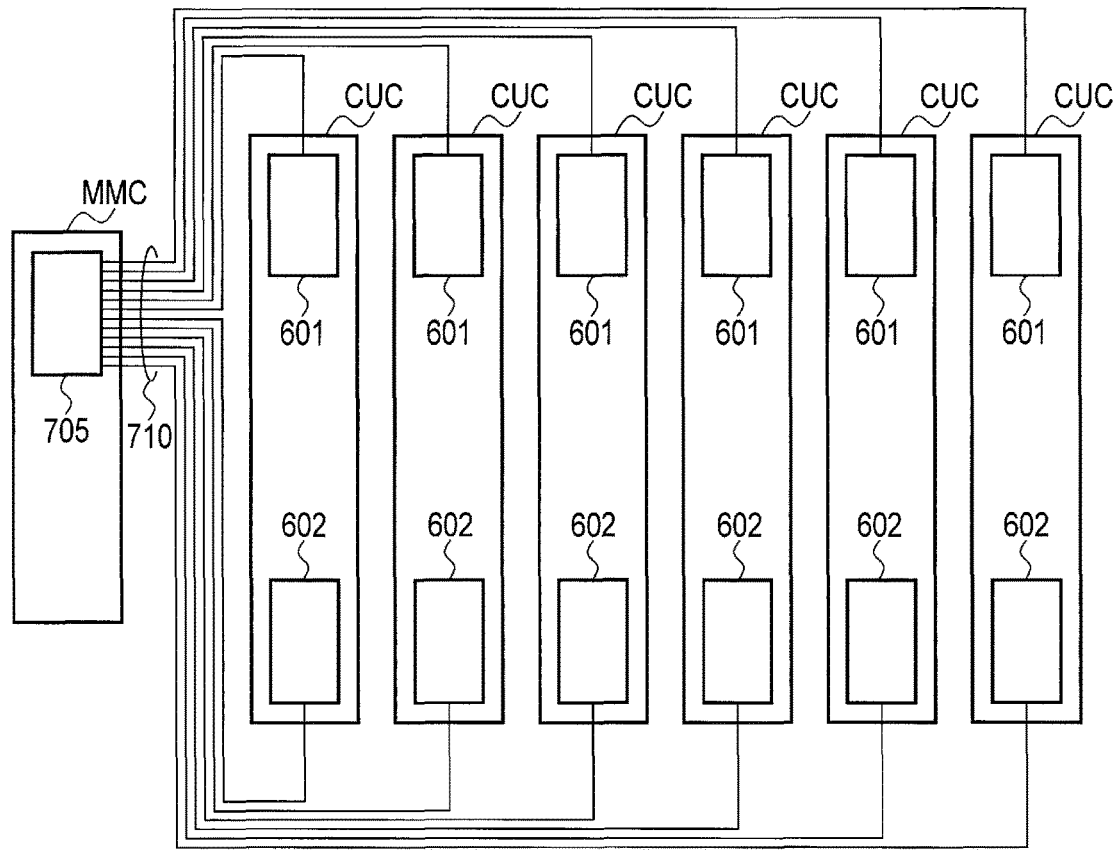
FIG. 34 is a diagram showing a connection relationship between the CU card and the MM card.

FIG. 34 is a diagram showing a relationship in connection between the CUC and MMC.

In FIG. 34, a connection using an I2C interface is omitted and a relationship in connection using an interface that conforms to the Ethernet standard is shown. The relationship in connection shown in the figure is achieved by the interconnection in each of the cards and the interconnection formed in the backplane 300.

The MMC includes twelve interfaces 710 that conform to the Ethernet standard. Each CUC includes two interfaces 607 that conform to the Ethernet standard. The MMC is connected to six CUCs using two interfaces 710 for each CUC.

[5. Example of Connection for Scale-Out]

Next, an example of connection for scaling out the storage unit 101 will be described with reference to FIGS. 35 to 37.

Hereinafter, an example of connection for constructing one storage unit 101 using two storage systems 100 of one enclosure 200 (connection example 1) will be described. To distinguish a plurality of storage systems from one another, an alphabet is added to the end of the reference numeral of each of the storage systems 100.

Figure 35:
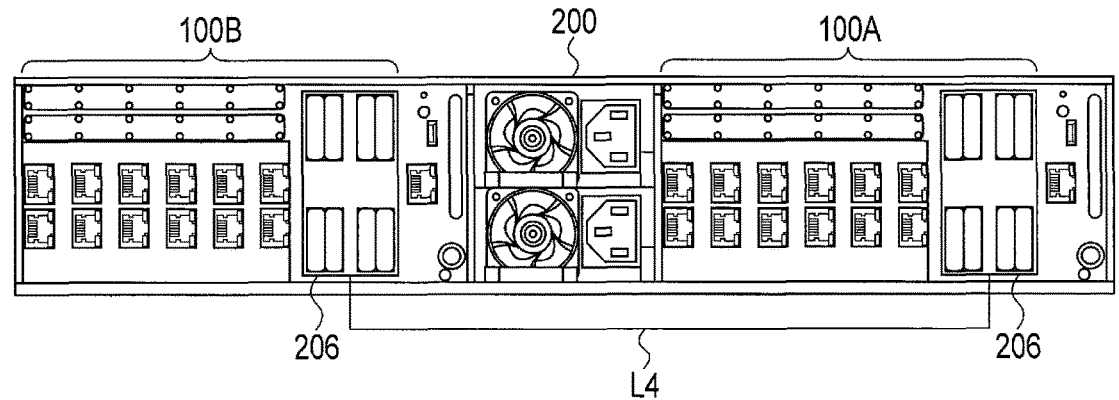
FIG. 35 is a diagram showing a connector group used in connection example 1.

FIG. 35 is a diagram showing a connector group for use in connection example 1. FIG. 36 is a diagram showing a specific connection relationship according to connection example 1. FIG. 37 is a diagram showing a storage unit 101 constructed logically by connection example 1.

As shown in FIG. 35, in connection example 1, the connector 206 of one (storage system 100A) of the two storage systems 100 of one enclosure 200 is connected to the connector 206 of the other (storage system 100B).

Figure 36:
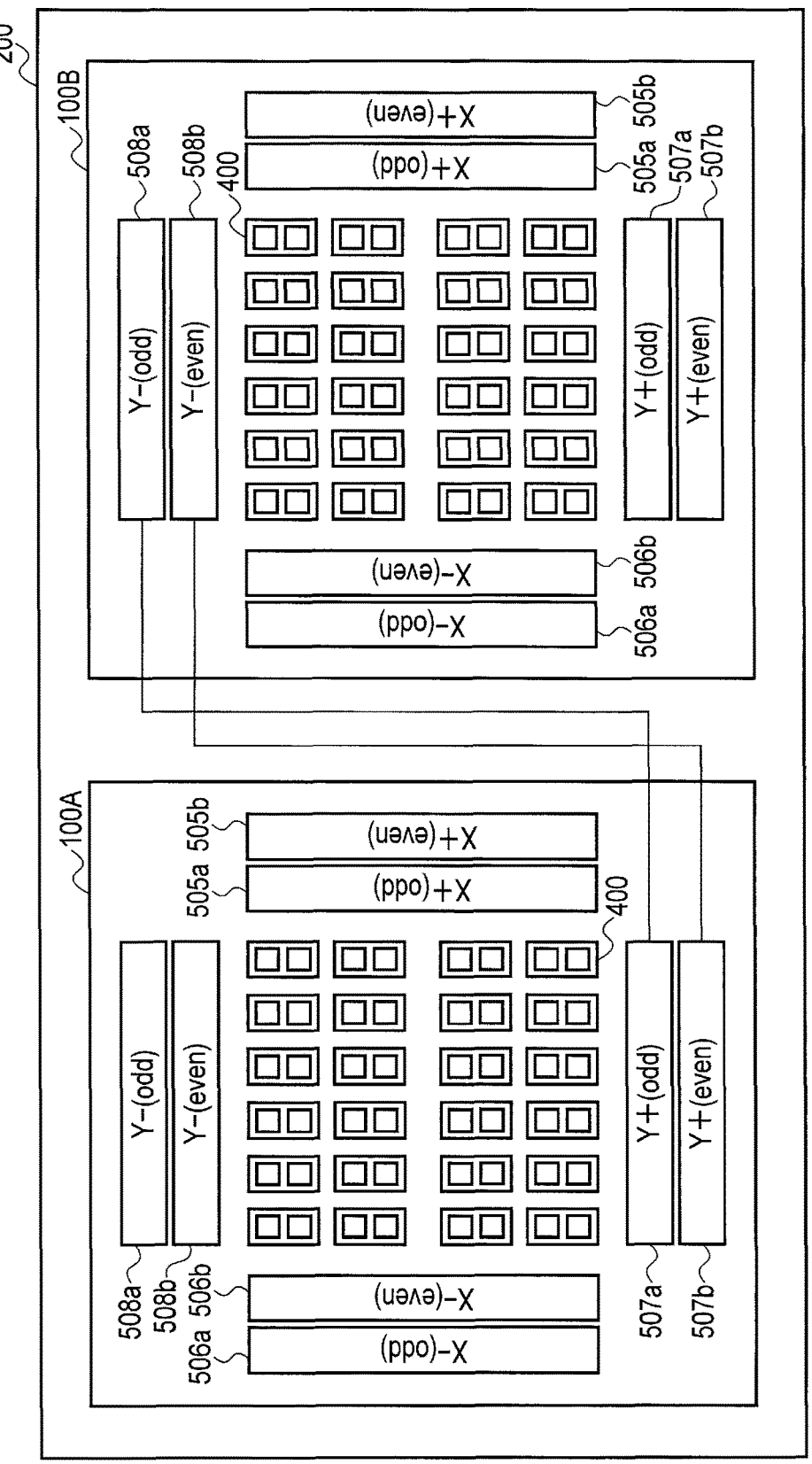
FIG. 36 is a diagram showing a specific connection relationship according to connection example 1.

Specifically, as shown in FIG. 36, the connector 507a of the storage system 100A is connected to the connector 508a of the storage system 100B. The connector 507b of the storage system 100A is connected to the connector 508b of the storage system 100B. With these connections, the storage unit 101B of the storage system 100B is connected in the "Y+" direction of the storage unit 101A of the storage system 100A.

Figure 37:
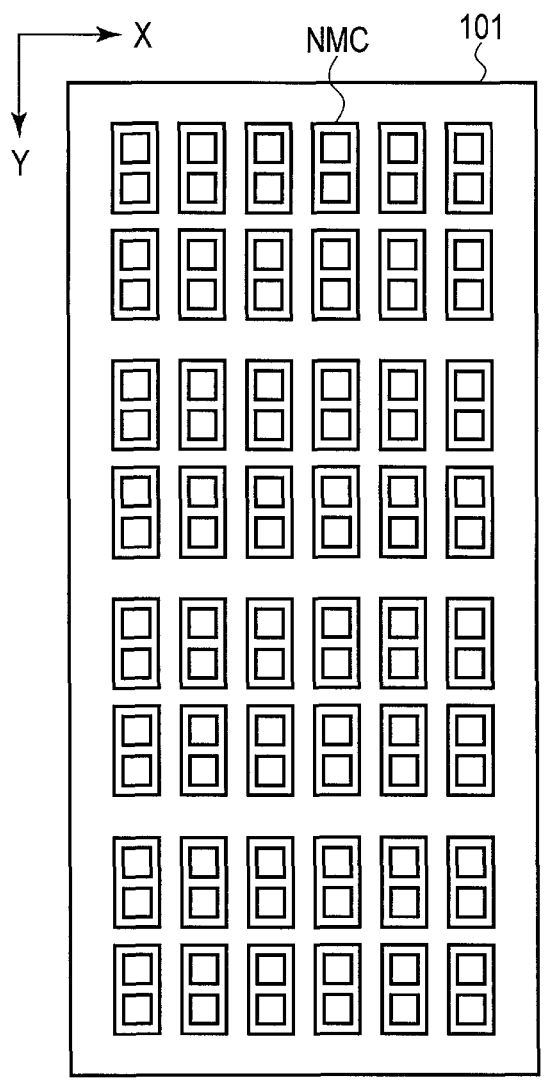
FIG. 37 is a diagram showing a storage unit logically configured by connection example 1.

As a result, as shown in FIG. 37, the storage units 101A and 101B of the storage systems 100A and 100B are integrated to configure a new storage unit 101 logically. The new storage unit 101 includes six NMCs arranged in the X-axis direction and eight NMCs arranged in the Y-axis direction.

In connection example 1, two storage units 101 are connected in the Y-axis direction; however, this example is not limited to this. For example, two storage units 101 can be connected in the X-axis direction.

Advantageous Effect

The configuration and operation of the storage system 100 according to the third embodiment as described above can bring about the same advantages as the foregoing advantageous effects (1)-(3). Further, the storage system 100 according to the third embodiment can bring about at least the following advantageous effect (4).

(4) Both an Increase in Capacity and a Decrease in Latency can be Achieved.

For the advantageous effect (4), the technical background of the storage system will be described.

A) Technical Background

Recently, the amount and the complexity of data handled by enterprises and governments have been dramatically and continuously increasing. In order to process such big data, there is a tendency to require a data processing platform that allows an efficient macro-scale data processing with 3V (volume, variety, velocity).

However, in systems represented by, e.g., Hadoop, a number of processings corresponding to data management is required prior to the start of actual computing such as data transfer, preprocessing and metadata processing. Even though a large number of processors are arranged and a platform is prepared to perform the processings at the same time, it is difficult to perform a desired data processing at high speed with efficiency, because data consistency management become more complex by dispersing data.

Furthermore, the degree of the above difficulty is greatly increased as an amount of data and a required processing speed are increased. If this system is configured by a combination of general-purpose products, a tradeoff between data size and latency will be a bother. In other words, in order to increase data size that can be handled, latency has to be sacrificed. In order to decrease latency, data size that can be handled has to be decreased. More specifically, there are hardly any platforms capable of handling data size of an order exceeding TB (terabit) and achieving sub-millisecond latency. Moreover, even if there is such a platform, the reality is that the system would be very expensive.

B) Third Embodiment

In view of the foregoing technical background, the storage system 100 according to the third embodiment includes at least the following two configurations.

First, all active data items are stored in NAND memories 141 (405 to 408, 411 to 414) which are the first memory of the NM 140. The NAND memories 141 are used as both an "inexpensive bit cost" memory which can provide a system capable of storing a large-scale database at reasonable costs and a "nonvolatile" memory necessary for satisfying high reliability, which is resistible to utilization of enterprises. Thus, the storage system 100 according to the third embodiment is more suitable for constructing a large-scale, high-reliability database than, for example, a storage system of a DRAM-based in-memory. Furthermore, the storage system 100 has access speed sufficient for achieving the "sub-millisecond order" latency which is required in big data processing. These characteristics are very difficult to achieve in, for example, an HDD-based storage system.

Secondly, the memory system according to the third embodiment includes PMUs 112 and routing circuits 111 which are network ports via which the NCs 140C, which read and write data of the NAND memory 141, transmit and receive packet data to/from each other. The network ports are connected to each other to configure a two-dimensional meshed network. Accordingly, the entire network can be regarded as a (single) very large nonvolatile memory which can be accessed in a single address space. The NCs 140C each includes an interface (in this instance, PCIe I/F 113) which is directly connectable to the CU 110. Accordingly, the very large nonvolatile memory space can be shared among a plurality of CPUs 601 of a plurality of CUs 110. In other words, the memory system 100 according to the third embodiment is advantageous in that a number of CPUs 601 perform a large-scale parallel operation through a single very large database. Therefore, it can be said that this system is suitable as a platform for analyzing big data with the foregoing 3V.

For example, as shown in FIGS. 17 and 35-37, in the storage system 100 according to the third embodiment, two storage systems 100A and 100 B can be electrically connected to each other via the I/F unit 120 to scale-out the storage unit 101. By scaling out the storage unit 101, its capacity can be increased with ease.

In addition, as shown in FIG. 10, in the storage system 100 according to the third embodiment, the number of steps can be reduced even when the storage system is scaled out. Accordingly, latency due to an increase in the number of steps can be shortened.

As described above, according to the configuration and operation of the storage system 100 according to the third embodiment, both an increase in capacity and a decrease in latency can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage system comprising:
a storage unit comprising memory units and routing units;
a connection unit configured to connect the storage unit to an external device and control the storage unit; and
a management unit configured to at least monitor power supply voltages of the storage unit and the connection unit,
wherein
each of the memory units comprises a nonvolatile memory and a control unit configured to control the nonvolatile memory;
each of the routing units is connected to one or more memory units of the memory units via one or more first external routes;
each of the routing units is connected to one or more routing units via one or more second external routes;
each of the routing units is configured to control transfer of a first packet and a second packet different from the first packet between the connection unit and the one or more memory units;
a routing direction of the first packet is from the one or more memory units to the connection unit;
a routing direction of the second packet is from the connection unit to the one or more memory units; and
each of the routing units comprises first inside routes for routing the first packet and second inside routes for routing the second packet, a total number of the first inside routes and the second inside routes larger than a total number of the first external routes and the second external routes.

2. The storage system of claim 1, wherein each of the routing units comprises:
a first memory configured to store the first packet; and
a second memory configured to store the second packet.

3. The storage system of claim 2, wherein each of the routing units further comprises:
a first calculator configured to determine routing of the first packet stored in the first memory; and
a second calculator configured to determine routing of the second packet stored in the second memory.

4. The storage system of claim 3, wherein each of the first routing calculator and the second routing calculator is configured to determine the routing based on a part of an address described in the packet.

5. The storage system of claim 4, wherein the part of the address excluding a least significant bit.

6. The storage system of claim 2, wherein each of the routing units further comprises a selector configured to select the first packet or the second packet and store a selected packet in the first memory or the second memory.

7. The storage system of claim 2, wherein the first packet comprises a reply packet, a packet in a reply direction, a packet with a first source, or a packet with a first destination and the second packet comprises a send packet, a packet in a send direction, a packet with a second source, or a packet with a second destination.

8. The storage system of claim 2, wherein the storage unit further comprises a packet control unit configured to analyze the first packet or the second packet transferred from one of the routing units and transmit the first packet or the second packet to one of the memory units based on a result of analysis.

9. The storage system of claim 1, further comprising a first power supply unit configured to convert an external power supply voltage from an external power supply into a first power supply voltage and apply the first power supply voltage to at least one of the storage unit, the connection unit, or the management unit.

10. The storage system of claim 9, further comprising a second power supply unit configured to generate a second power supply voltage based on the first power supply voltage applied from the first power supply unit, wherein the second power supply unit applies the second power supply voltage at least to the storage system when the storage system is electrically shut off from the external power supply.

11. A method of controlling a storage system comprises a storage unit comprising memory units and routing units, a connection unit configured to connect the storage unit to an external device and control the storage unit, and a management unit configured to at least monitor which at least monitors power supply voltages of the storage unit and the connection unit, wherein each of the memory units comprises a nonvolatile memory and a control unit configured to control the nonvolatile memory, each of the routing units is connected to one or more memory units of the memory units via one or more first external routes, each of the routing units is connected to one or more routing units via one or more second external routes, each of the routing units is configured to control transfer of a first packet and a second packet different from the first packet between the connection unit and the one or more memory units, a routing direction of the first packet is from the one or more memory units to the connection unit, a routing direction of the second packet is from the connection unit to the one or more memory units, and each of the routing units comprises first inside routes for routing the first packet and second inside routes for routing the second packet, a total number of the first inside routes and the second inside routes larger than a total number of the first external routes and the second external routes, the method comprising:
controlling, by each of the routing units, transfer of the first packet and the second packet between the each of the routing units and the another routing unit.

12. The method of claim 11, further comprising storing the first packet in a first memory; and storing the second packet in a second memory.

13. The method of claim 12, further comprising:
determining routing of the first packet stored in the first memory; and determining routing of the second packet stored in the second memory.

14. The method of claim 12, further comprising selecting the first packet or the second packet.

15. The method of claim 11, wherein the first packet comprises a reply packet, a packet in a reply direction, a packet with a first source, or a packet with a first destination and the second packet comprises a send packet, a packet in a send direction, a packet with a second source, or a packet with a second destination.

16. The method of claim 11, further comprising determining routing based on a part of an address described in the packet.

17. The method of claim 11, further comprising determining routing based on a part of an address described in the packet, the part excluding a least significant bit.

* * * * *